(12) United States Patent
Manolakos et al.

(10) Patent No.: US 11,792,741 B2
(45) Date of Patent: Oct. 17, 2023

(54) RECEIVE CONFIGURATION FOR RADAR SIGNAL ON UPLINK RESOURCES AND ASSOCIATED POWER CONTROL PARAMETER

(71) Applicant: QUALCOMM Incorporated, San Diego, CA (US)

(72) Inventors: Alexandros Manolakos, Escondido, CA (US); Weimin Duan, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/408,959

(22) Filed: Aug. 23, 2021

(65) Prior Publication Data

US 2022/0116886 A1  Apr. 14, 2022

Related U.S. Application Data

(60) Provisional application No. 63/089,721, filed on Oct. 9, 2020.

(51) Int. Cl.
*G01S 7/02* (2006.01)
*H04B 17/24* (2015.01)
(Continued)

(52) U.S. Cl.
CPC ........... *H04W 52/243* (2013.01); *G01S 7/023* (2013.01); *H04B 17/24* (2015.01); *H04B 17/345* (2015.01);
(Continued)

(58) Field of Classification Search
CPC ...... G01S 7/003–0236; H04B 7/02–12; H04B 17/0082–3913;
(Continued)

(56) References Cited

U.S. PATENT DOCUMENTS

2020/0209378 A1  7/2020  Yokev et al.
2020/0229102 A1  7/2020  Gubeskys et al.
(Continued)

FOREIGN PATENT DOCUMENTS

WO  WO-03001742 A1 *  1/2003  ............ H04W 16/14
WO  2020126050 A1  6/2020

OTHER PUBLICATIONS

International Search Report and Written Opinion—PCT/US2021/047316—ISA/EPO—Dec. 2, 2021.

*Primary Examiner* — Timothy J Weidner
(74) *Attorney, Agent, or Firm* — QUALCOMM Incorporated

(57) ABSTRACT

In an aspect, a first base station (e.g., Rx gNB) receives, from a radar controller, a configuration of UL T-F resources for the first base station to receive at least one radar signal from a second base station. The first base station further determines power control parameter(s) associated with the at least one radar signal, at least one UL transmission, or a combination thereof. The first base station performs, based on the power control parameter(s), action(s) to mitigate impact by the at least one radar signal to the at least one UL transmission, or by the at least one UL transmission to the at least one radar signal, or a combination thereof. The first base station measures the at least one radar signal on the set of UL T-F resources in accordance with the configuration.

30 Claims, 30 Drawing Sheets

(51) Int. Cl.
H04B 17/345 (2015.01)
H04W 24/08 (2009.01)
H04W 24/10 (2009.01)
H04W 52/14 (2009.01)
H04W 52/24 (2009.01)
H04W 52/36 (2009.01)
H04W 52/38 (2009.01)
H04W 52/42 (2009.01)
H04W 72/00 (2023.01)
H04W 84/02 (2009.01)
H04W 88/02 (2009.01)
H04W 88/08 (2009.01)
H04W 88/12 (2009.01)
H04W 92/02 (2009.01)
H04W 92/10 (2009.01)
H04W 92/12 (2009.01)
H04W 72/541 (2023.01)
H04W 72/53 (2023.01)

(52) U.S. Cl.
CPC ........... *H04W 24/08* (2013.01); *H04W 24/10* (2013.01); *H04W 52/143* (2013.01); *H04W 52/146* (2013.01); *H04W 52/241* (2013.01); *H04W 52/365* (2013.01); *H04W 52/386* (2013.01); *H04W 52/42* (2013.01); *H04W 72/53* (2023.01); *H04W 72/541* (2023.01); H04W 84/02 (2013.01); H04W 88/02 (2013.01); H04W 88/08 (2013.01); H04W 88/12 (2013.01); H04W 92/02 (2013.01); H04W 92/10 (2013.01); H04W 92/12 (2013.01)

(58) Field of Classification Search
CPC . H04J 11/0023–0093; H04J 2011/0003–0096; H04L 5/0001–26; H04W 8/22–245; H04W 24/02–10; H04W 28/02–26; H04W 36/0005–385; H04W 48/02–20; H04W 52/02–60; H04W 72/02–569; H04W 74/002–0891; H04W 84/005–22; H04W 88/005–188; H04W 92/02–24
See application file for complete search history.

(56) References Cited

U.S. PATENT DOCUMENTS

2022/0113400 A1\* 4/2022 Manolakos ......... H04W 56/001
2022/0260709 A1\* 8/2022 Lee ....................... H04W 52/02

\* cited by examiner

| Name | Value |
|---|---|
| Radar Session ID | 12345678 |
| TX Transmission Time | 20000.00 μsec |
| Expected Receive Time | 20133.33 μsec |
| Expected Receive Time Uncertainty | [lower bound, upper bound] |

FIG. 13

| Name | Value |
|---|---|
| Radar Session ID | 12345678 |
| Expected Doppler Shift | 80,000 m/sec |
| Expected Doppler Spread | 10,000 m/sec |

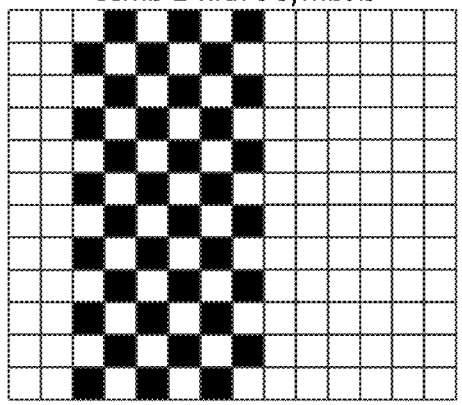
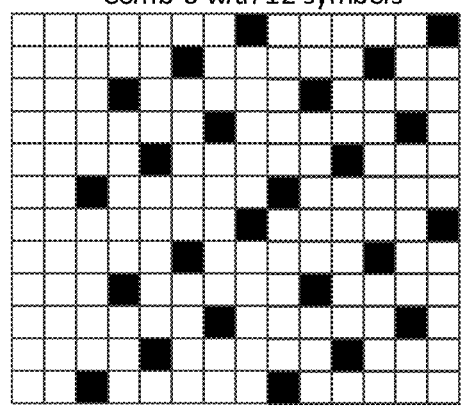
FIG. 18G
FIG. 18H

RECEIVE CONFIGURATION FOR RADAR SIGNAL ON UPLINK RESOURCES AND ASSOCIATED POWER CONTROL PARAMETER

CROSS-REFERENCE TO RELATED APPLICATIONS

The present application for patent claims the benefit of U.S. Provisional Application No. 63/089,721, entitled "RECEIVE CONFIGURATION FOR RADAR SIGNAL ON UPLINK RESOURCES AND ASSOCIATED POWER CONTROL PARAMETER," filed Oct. 9, 2020, assigned to the assignee hereof, and expressly incorporated herein by reference in its entirety.

BACKGROUND OF THE DISCLOSURE

1. Field of the Disclosure

Aspects of the disclosure relate generally to wireless communications, and more particularly to a receive configuration for radar signal(s) on uplink resources and associated power control parameter(s).

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of mmW RF signals for wireless communication between network nodes, such as base stations, user equipments (UEs), vehicles, factory automation machinery, and the like. However, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a radar controller includes determining a first configuration of a set of uplink (UL) time-frequency (T-F) resources for a first base station to receive at least one radar signal; determining at least one power control parameter associated with the at least one radar signal, at least one UL transmission with a potential for interference with the at least one radar signal, or a combination thereof; and transmitting, to the first base station, a first request for a measurement operation associated with the first configuration and the at least one power control parameter.

In some aspects, the method includes determining a second configuration of a set of downlink (DL) T-F resources for a second base station to transmit the at least one radar signal; and transmitting, to the second base station, a second request for a transmission operation associated with the second configuration to the second base station.

In some aspects, the second configuration is configured on-demand, aperiodically, or semi-persistently.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the first configuration is configured on-demand, aperiodically, or semi-persistently.

In some aspects, the method includes receiving, from the first base station, an interference measurement report; and determining, based on the interference measurement report, whether to update the first configuration, the at least one power control parameter, or a combination thereof.

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is received in response to at least one triggering event.

In some aspects, the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

In some aspects, the radar controller corresponds to an access network component, a core network component, a location management function (LMF) component, a component that is external to a serving network associated with the first base station, or a combination thereof.

In some aspects, the at least one power control parameter is configured as an update to at least one other power control power determined at the first base station independently from the radar controller.

In an aspect, a method of operating a first base station includes receiving, from a radar controller, a configuration of a set of uplink (UL) time-frequency (T-F) resources for the first base station to receive at least one radar signal; determining at least one power control parameter associated with the at least one radar signal, at least one UL transmission, or a combination thereof; performing, based on the at least one power control parameter, at least one action to mitigate impact by the at least one radar signal to the at least one UL transmission, or by the at least one UL transmission to the at least one radar signal, or a combination thereof; and measuring the at least one radar signal on the set of UL T-F resources in accordance with the configuration.

In some aspects, the determining comprises receiving the at least one power control parameter from the radar controller, or the determining determines the at least one power control parameter independently from the radar controller.

In some aspects, the at least one action comprises: muting the at least one UL transmission or modifying a transmission power level of the at least one UL transmission, or transmitting a message to the radar controller to request a modification to a transmission power level of the at least one radar signal, or a combination thereof.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the configuration is configured on-demand, aperiodically, or semi-persistently.

In some aspects, the method includes transmitting, to the radar controller, an interference measurement report.

In some aspects, the method includes receiving, from the radar controller in response to the interference measurement report, an update to the configuration, the at least one power control parameter, or a combination thereof.

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is transmitted in response to at least one triggering event.

In some aspects, the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

In some aspects, the radar controller corresponds to an access network component, a core network component, a location management function (LMF) component, a component that is external to a serving network associated with the first base station, or a combination thereof.

In some aspects, the at least one radar signal is received from a second based station.

In an aspect, a radar controller includes a memory; at least one transceiver; and at least one processor communicatively coupled to the memory and the at least one transceiver, the at least one processor configured to: determine a first configuration of a set of uplink (UL) time-frequency (T-F) resources for a first base station to receive at least one radar signal; determine at least one power control parameter associated with the at least one radar signal, at least one UL transmission with a potential for interference with the at least one radar signal, or a combination thereof and transmit, via the at least one transceiver, to the first base station, a first request for a measurement operation associated with the first configuration and the at least one power control parameter.

In some aspects, the at least one processor is further configured to: determine a second configuration of a set of downlink (DL) T-F resources for a second base station to transmit the at least one radar signal; and transmit, via the at least one transceiver, to the second base station, a second request for a transmission operation associated with the second configuration to the second base station.

In some aspects, the second configuration is configured on-demand, aperiodically, or semi-persistently.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the first configuration is configured on-demand, aperiodically, or semi-persistently.

In some aspects, the at least one processor is further configured to: receive, via the at least one transceiver, from the first base station, an interference measurement report; and determine, based on the interference measurement report, whether to update the first configuration, the at least one power control parameter, or a combination thereof.

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is received in response to at least one triggering event.

In some aspects, the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

In some aspects, the radar controller corresponds to an access network component, a core network component, a location management function (LMF) component, a component that is external to a serving network associated with the first base station, or a combination thereof.

In some aspects, the at least one power control parameter is configured as an update to at least one other power control power determined at the first base station independently from the radar controller.

In an aspect, a first base station includes a memory; at least one transceiver; and at least one processor communicatively coupled to the memory and the at least one transceiver, the at least one processor configured to: receive, via the at least one transceiver, from a radar controller, a configuration of a set of uplink (UL) time-frequency (T-F) resources for the first base station to receive at least one radar signal; determine at least one power control parameter associated with the at least one radar signal, at least one UL transmission, or a combination thereof; perform, based on the at least one power control parameter, at least one action to mitigate impact by the at least one radar signal to the at least one UL transmission, or by the at least one UL transmission to the at least one radar signal, or a combination thereof; and measure the at least one radar signal on the set of UL T-F resources in accordance with the configuration.

In some aspects, the determining comprises receiving the at least one power control parameter from the radar controller, or the determining determines the at least one power control parameter independently from the radar controller.

In some aspects, the at least one action comprises: mute the at least one UL transmission or modifying a transmission power level of the at least one UL transmission, or transmit, via the at least one transceiver, a message to the radar controller to request a modification to a transmission power level of the at least one radar signal, or a combination thereof.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the configuration is configured on-demand, aperiodically, or semi-persistently.

In some aspects, the at least one processor is further configured to: transmit, via the at least one transceiver, to the radar controller, an interference measurement report.

In some aspects, the at least one processor is further configured to: receive, via the at least one transceiver, from the radar controller in response to the interference measurement report, an update to the configuration, the at least one power control parameter, or a combination thereof.

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is transmitted in response to at least one triggering event.

In some aspects, the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

In some aspects, the radar controller corresponds to an access network component, a core network component, a location management function (LMF) component, a component that is external to a serving network associated with the first base station, or a combination thereof.

In some aspects, the at least one radar signal is received from a second based station.

In an aspect, a radar controller includes means for determining a first configuration of a set of uplink (UL) time-frequency (T-F) resources for a first base station to receive at least one radar signal; means for determining at least one power control parameter associated with the at least one radar signal, at least one UL transmission with a potential for interference with the at least one radar signal, or a combination thereof; and means for transmitting, to the first base station, a first request for a measurement operation associated with the first configuration and the at least one power control parameter.

In some aspects, the method includes means for determining a second configuration of a set of downlink (DL) T-F resources for a second base station to transmit the at least one radar signal; and means for transmitting, to the second base station, a second request for a transmission operation associated with the second configuration to the second base station.

In some aspects, the second configuration is configured on-demand, aperiodically, or semi-persistently.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the first configuration is configured on-demand, aperiodically, or semi-persistently.

In some aspects, the method includes means for receiving, from the first base station, an interference measurement report; and means for determining, based on the interference measurement report, whether to update the first configuration, the at least one power control parameter, or a combination thereof.

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is received in response to at least one triggering event.

In some aspects, the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

In some aspects, the radar controller corresponds to an access network component, a core network component, a location management function (LMF) component, a component that is external to a serving network associated with the first base station, or a combination thereof.

In some aspects, the at least one power control parameter is configured as an update to at least one other power control power determined at the first base station independently from the radar controller.

In an aspect, a first base station includes means for receiving, from a radar controller, a configuration of a set of uplink (UL) time-frequency (T-F) resources for the first base station to receive at least one radar signal; means for determining at least one power control parameter associated with the at least one radar signal, at least one UL transmission, or a combination thereof; means for performing, based on the at least one power control parameter, at least one action to mitigate impact by the at least one radar signal to the at least one UL transmission, or by the at least one UL transmission to the at least one radar signal, or a combination thereof; and means for measuring the at least one radar signal on the set of UL T-F resources in accordance with the configuration.

In some aspects, the determining comprises receiving the at least one power control parameter from the radar controller, or the determining determines the at least one power control parameter independently from the radar controller.

In some aspects, the at least one action comprises: means for muting the at least one UL transmission or modifying a transmission power level of the at least one UL transmission, or means for transmitting a message to the radar controller to request a modification to a transmission power level of the at least one radar signal, or a combination thereof.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the configuration is configured on-demand, aperiodically, or semi-persistently.

In some aspects, the method includes means for transmitting, to the radar controller, an interference measurement report.

In some aspects, the method includes means for receiving, from the radar controller in response to the interference measurement report, an update to the configuration, the at least one power control parameter, or a combination thereof.

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is transmitted in response to at least one triggering event.

In some aspects, the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

In some aspects, the radar controller corresponds to an access network component, a core network component, a location management function (LMF) component, a component that is external to a serving network associated with the first base station, or a combination thereof.

In some aspects, the at least one radar signal is received from a second based station.

In an aspect, a non-transitory computer-readable medium storing computer-executable instructions that, when executed by a radar controller, cause the radar controller to: determine a first configuration of a set of uplink (UL) time-frequency (T-F) resources for a first base station to receive at least one radar signal; determine at least one power control parameter associated with the at least one radar signal, at least one UL transmission with a potential for interference with the at least one radar signal, or a combination thereof; and transmit, to the first base station, a first request for a measurement operation associated with the first configuration and the at least one power control parameter.

In some aspects, instructions that, when executed by radar controller, further cause the radar controller to:

In some aspects, the second configuration is configured on-demand, aperiodically, or semi-persistently.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the first configuration is configured on-demand, aperiodically, or semi-persistently.

In some aspects, instructions that, when executed by radar controller, further cause the radar controller to:

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is received in response to at least one triggering event.

In some aspects, the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

In some aspects, the radar controller corresponds to an access network component, a core network component, a location management function (LMF) component, a component that is external to a serving network associated with the first base station, or a combination thereof.

In some aspects, the at least one power control parameter is configured as an update to at least one other power control power determined at the first base station independently from the radar controller.

In an aspect, a non-transitory computer-readable medium storing computer-executable instructions that, when executed by a first base station, cause the first base station to: receive, from a radar controller, a configuration of a set of uplink (UL) time-frequency (T-F) resources for the first base station to receive at least one radar signal; determine at least one power control parameter associated with the at least one radar signal, at least one UL transmission, or a combination thereof; perform, based on the at least one power control parameter, at least one action to mitigate impact by the at least one radar signal to the at least one UL transmission, or by the at least one UL transmission to the at least one radar signal, or a combination thereof; and measure the at least one radar signal on the set of UL T-F resources in accordance with the configuration.

In some aspects, the determining comprises receiving the at least one power control parameter from the radar controller, or the determining determines the at least one power control parameter independently from the radar controller.

In some aspects, the at least one action comprises: mute the at least one UL transmission or modifying a transmission power level of the at least one UL transmission, or transmit a message to the radar controller to request a modification to a transmission power level of the at least one radar signal, or a combination thereof.

In some aspects, the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

In some aspects, the configuration is configured on-demand, aperiodically, or semi-persistently.

In some aspects, instructions that, when executed by first base station, further cause the first base station to:

In some aspects, instructions that, when executed by first base station, further cause the first base station to:

In some aspects, the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

In some aspects, the one or more different resources comprise a time-domain resource, a frequency-domain resource, a beam resource, or a combination thereof.

In some aspects, the interference measurement report is associated with the at least one radar signal or the set of UL T-F resources or a combination thereof and is specific to a set of symbols, a set of frequencies, a set of beam directions, or a combination thereof.

In some aspects, the interference measurement report is transmitted in response to at least one triggering event.

In some aspects, the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

In some aspects, the radar controller corresponds to an access network component, a core network component, a location management function (LMF) component, a component that is external to a serving network associated with the first base station, or a combination thereof.

In some aspects, the at least one radar signal is received from a second based station.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitations thereof:

FIG. 13 shows an example of a TX/RX timing sub-list, according to embodiments of the disclosure.

FIGS. 18A-18H illustrate DL-PRS resource configurations in accordance with aspects of the disclosure.

DETAILED DESCRIPTION

Figure 1:
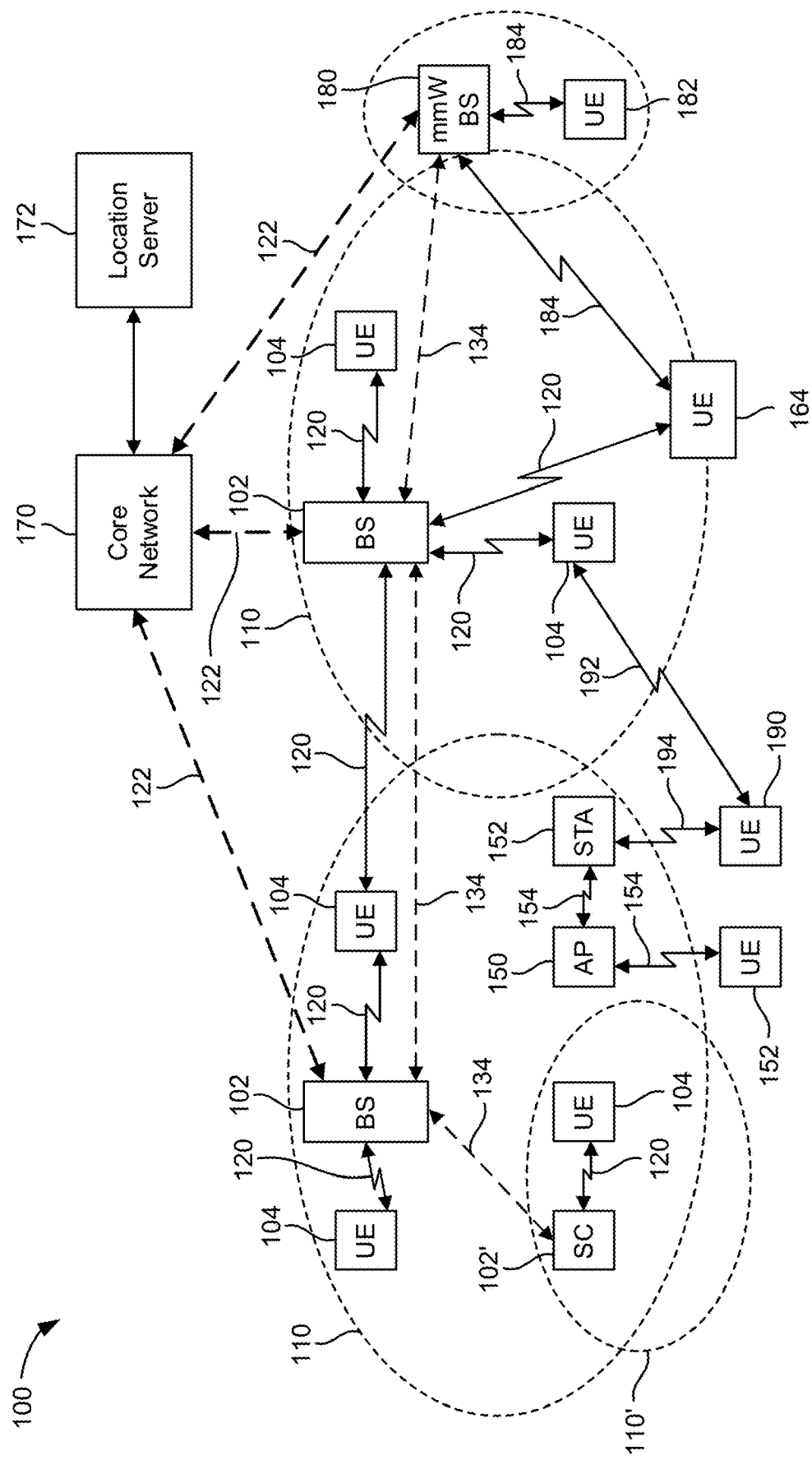
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
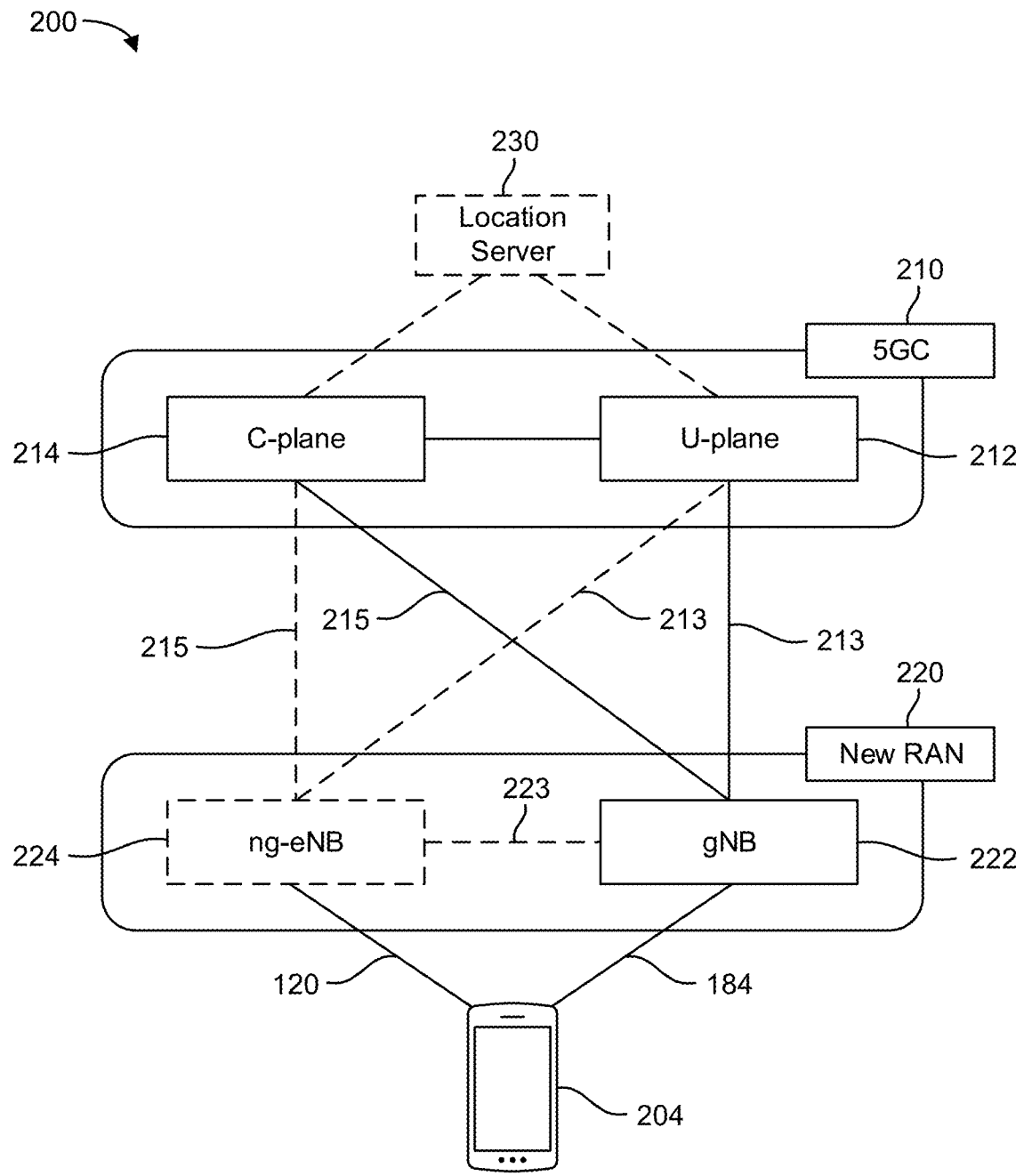
FIGS. 2A and 2B illustrate example wireless network structures, according to various aspects of the disclosure.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
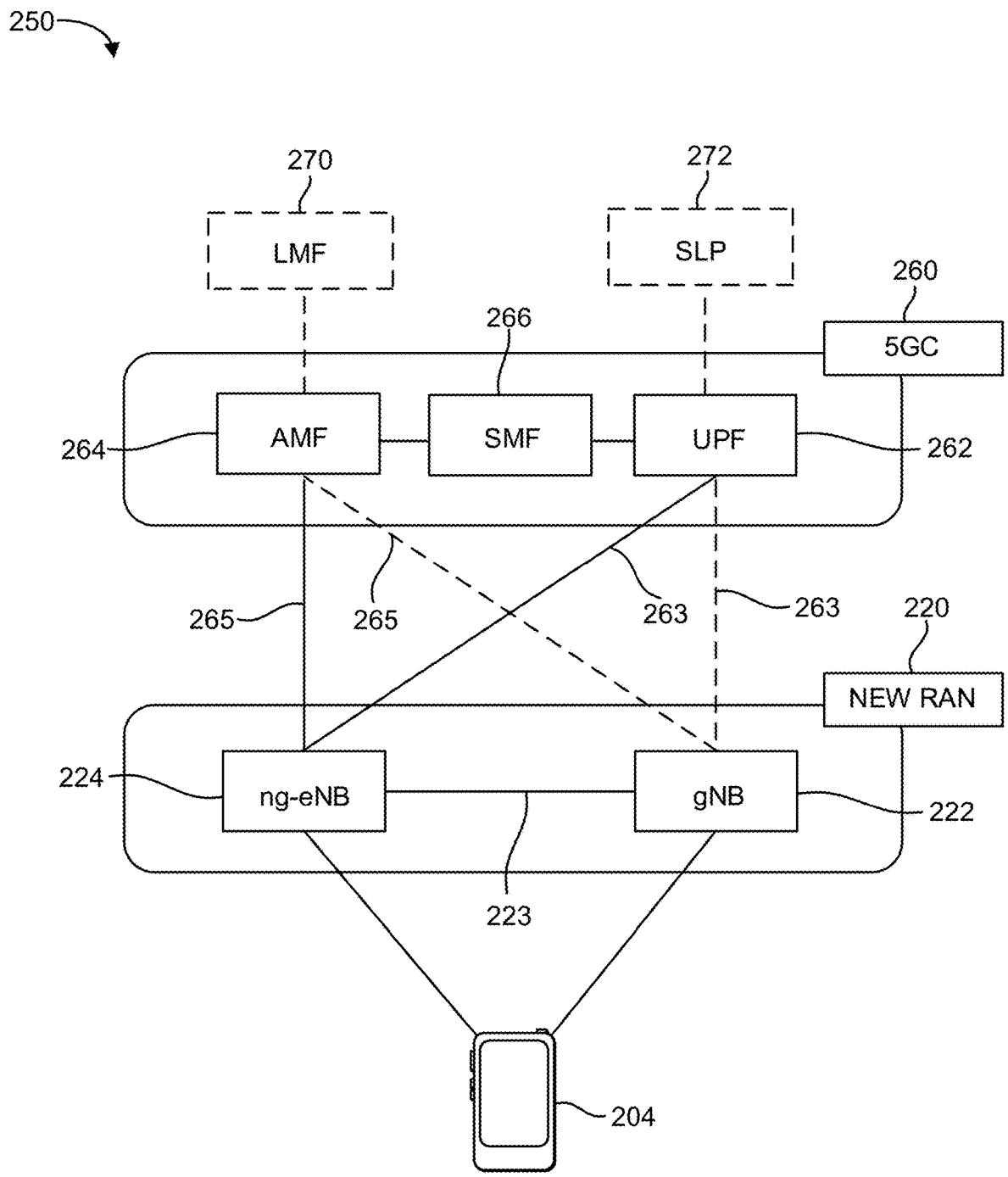

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
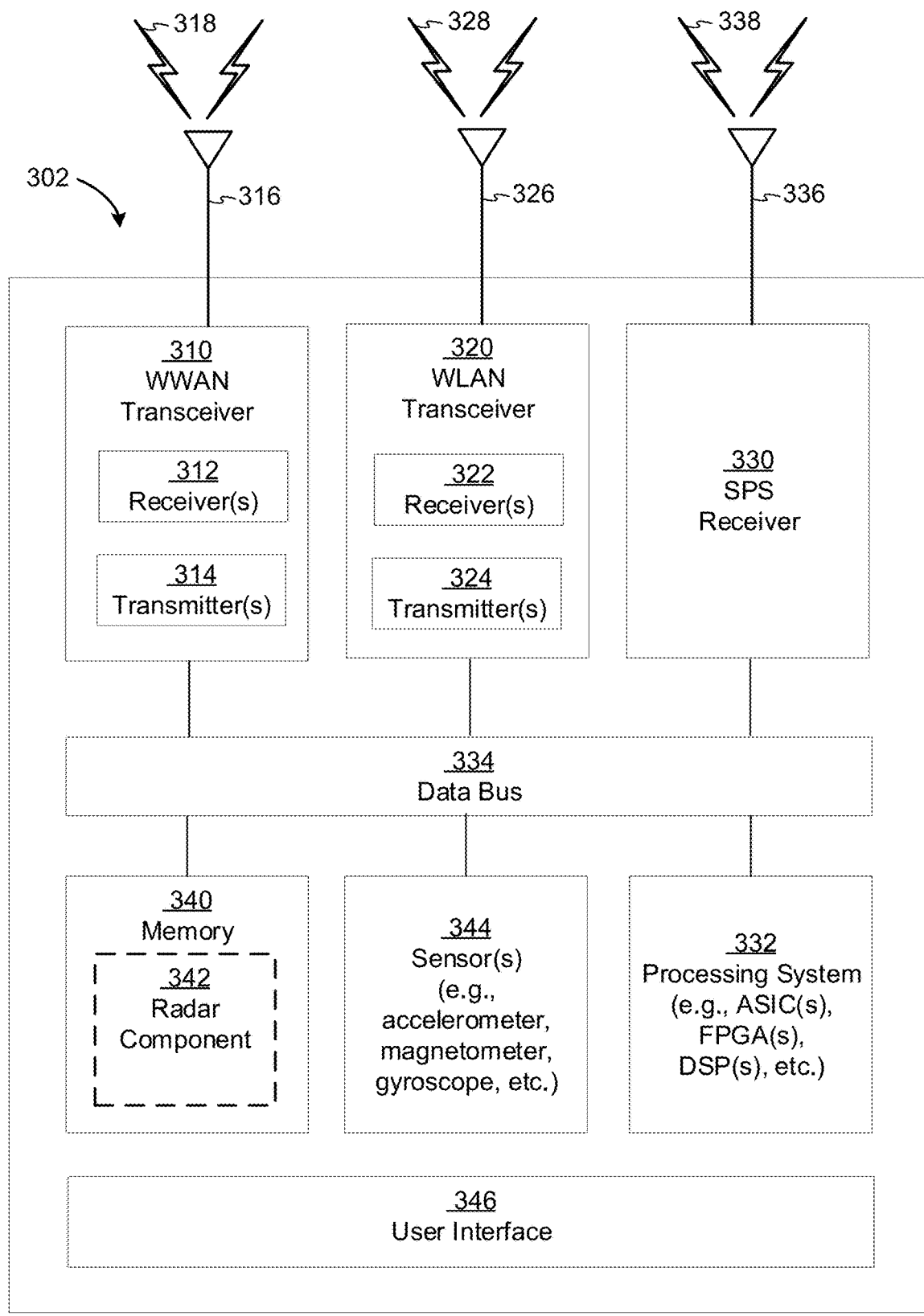
FIGS. 3A to 3C are simplified block diagrams of several sample aspects of components that may be employed in wireless communication nodes and configured to support communication as taught herein.
Figure 3B:
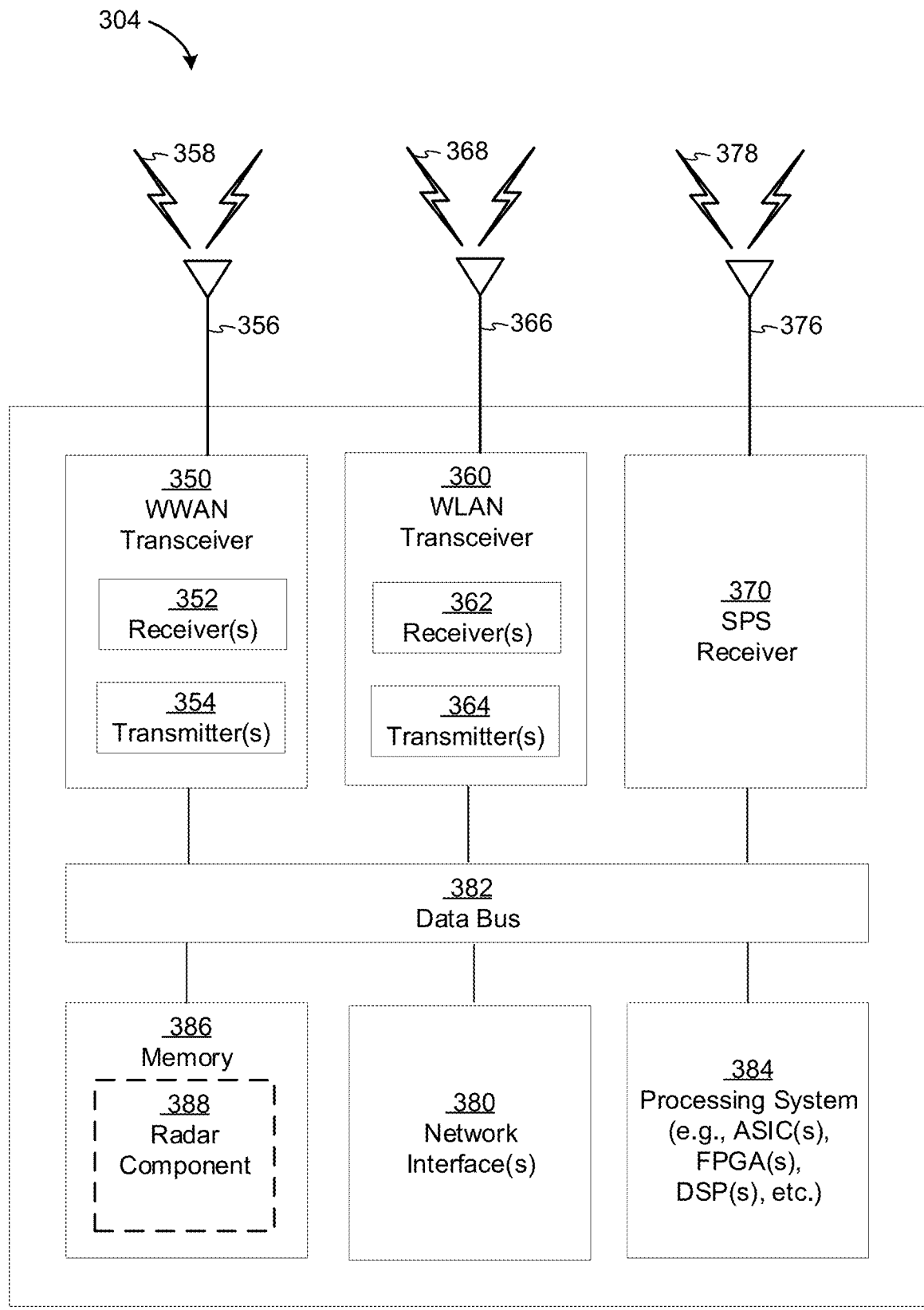
Figure 3C:
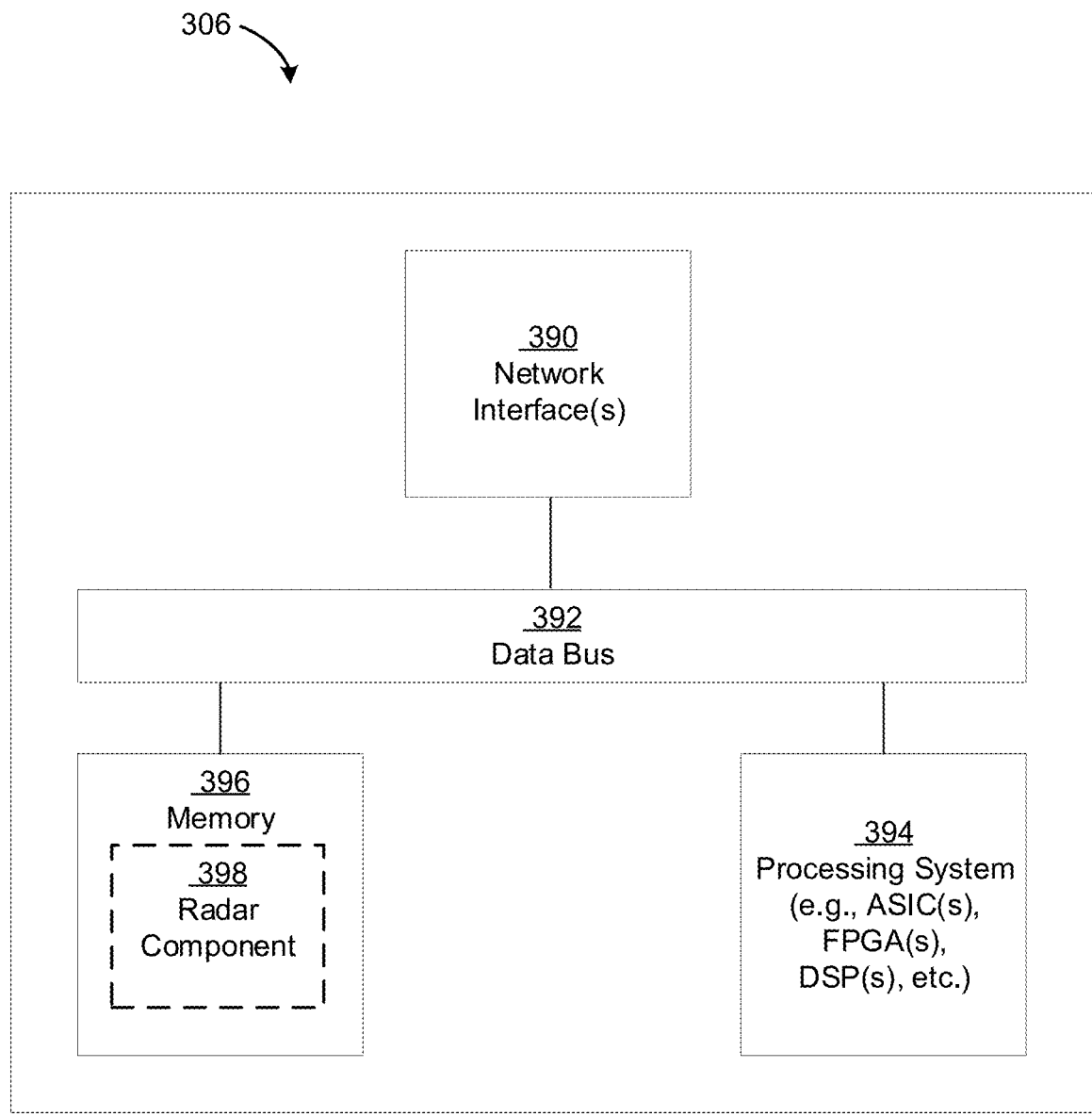

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, RF sensing, and for providing other processing functionality. The base station 304 includes a processing system 384 for providing functionality relating to, for example, RF sensing as disclosed herein, and for providing other processing functionality. The network entity 306 includes a processing system 394 for providing functionality relating to, for example, RF sensing as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include radar components 342, 388, and 398, respectively. The radar components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the radar components 342, 388, and 398 may be external to the processing systems 332, 384, and 394 (e.g., part of a modem processing system, integrated with another processing system, etc.). Alternatively, the radar components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the radar components 342, 388, and 398, etc.

Figure 4A:
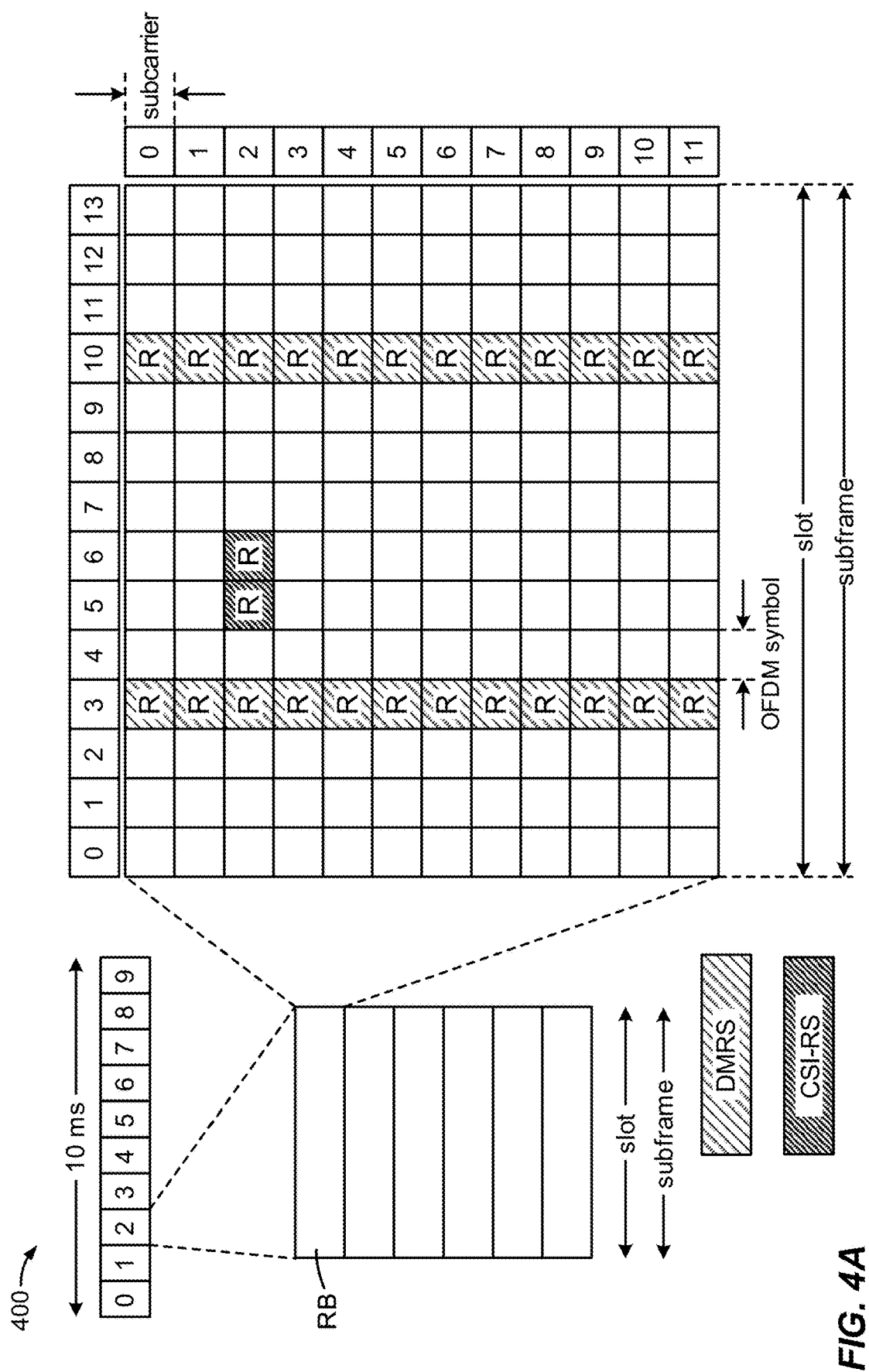
FIGS. 4A and 4B are diagrams illustrating examples of frame structures and channels within the frame structures, according to aspects of the disclosure.
Figure 4B:
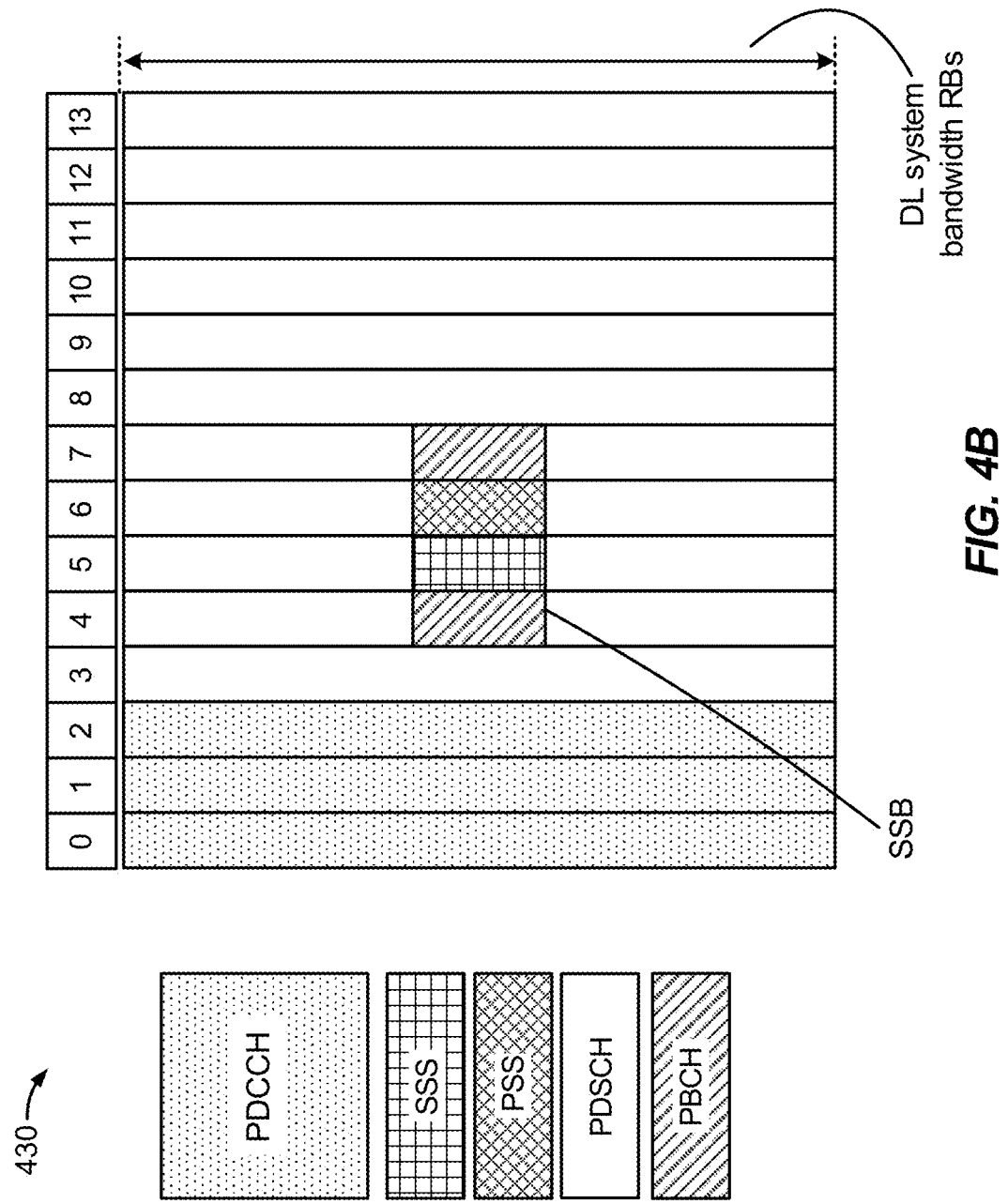

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ sub- frame | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages. In some cases, the DL RS illustrated in FIG. 4A may be positioning reference signals (PRS).

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 5A:
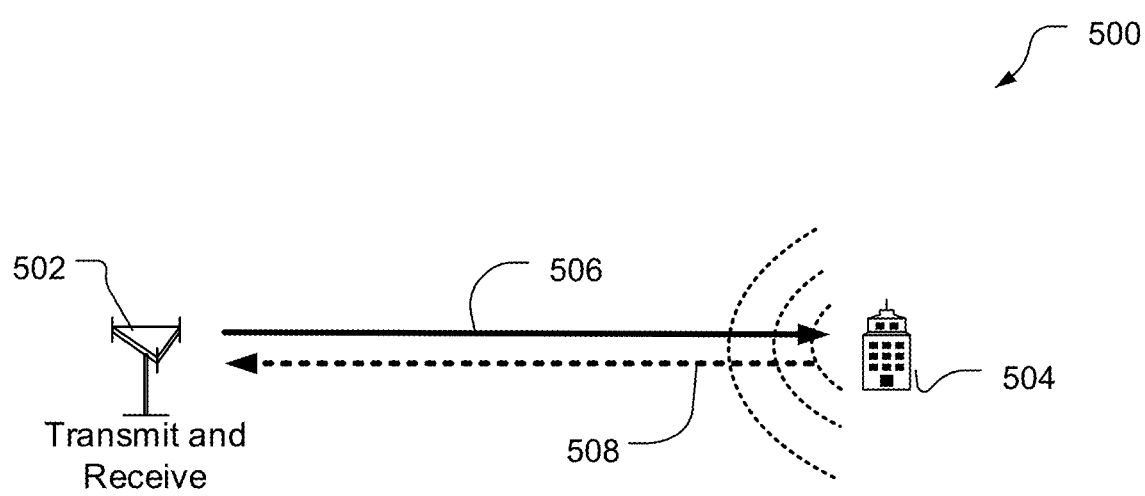
FIG. 5A illustrates an example monostatic radar system.
Figure 5B:
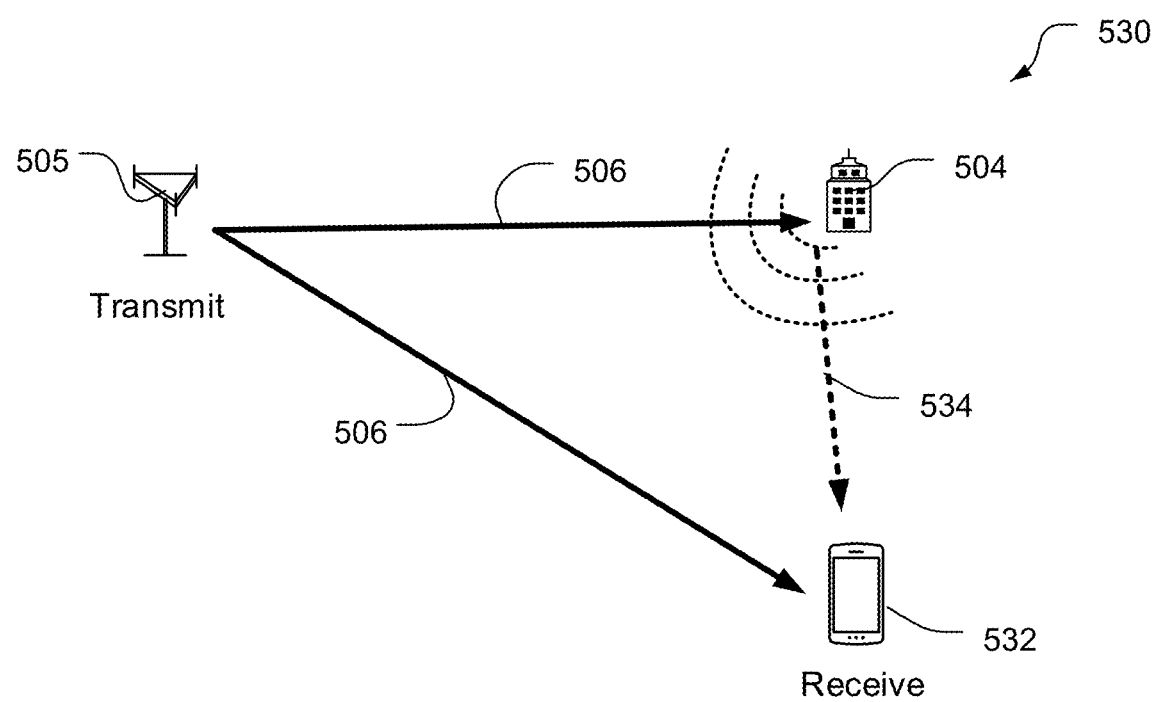
FIG. 5B illustrates an example bistatic radar system.

In general, there are different types of radar, and in particular, monostatic and bistatic radars. FIGS. 5A and 5B illustrate two of these various types of radar. Specifically, FIG. 5A is a diagram 500 illustrating a monostatic radar scenario, and FIG. 5B is a diagram 530 illustrating a bistatic radar scenario. In FIG. 5A, a base station 502 may be configured for full duplex operation and thus the transmitter (Tx) and receiver (Rx) are co-located. For example, a transmitted radio signal 506 may be reflected off of a target object, such as a building 504, and the receiver on the base station 502 is configured to receive and measure a reflected beam 508. This is a typical use case for traditional, or conventional, radar. In FIG. 5B, a base station 505 may be configured as a transmitter (Tx) and a UE 532 may be configured as a receiver (Rx). In this example, the transmitter and the receiver are not co-located, that is, they are separated. The base station 505 may be configured to transmit a beam, such as an omnidirectional downlink RF signal 506 which may be received by the UE 532. A portion of the RF signal 506 may be reflected or refracted by the building 504 and the UE 532 may receive this reflected signal 534. This is the typical use case for wireless communication-based (e.g., WiFi-based, LTE-based, NR-based) RF sensing. Note that while FIG. 5B illustrates using a downlink RF signal 506 as a RF sensing signal, uplink RF signals can also be used as RF sensing signals. In a downlink scenario, as shown, the transmitter is the base station 505 and the receiver is the UE 532, whereas in an uplink scenario, the transmitter is a UE and the receiver is a base station.

Referring to FIG. 5B in greater detail, the base station 505 transmits RF sensing signals (e.g., PRS) to the UE 532, but some of the RF sensing signals reflect off a target object such as the building 504. The UE 504 can measure the ToAs of the RF signal 506 received directly from the base station, and the ToAs of the reflected signal 534 which is reflected from the target object (e.g., the building 504).

The base station 505 may be configured to transmit the single RF signal 506 or multiple RF signals to a receiver (e.g., the UE 532). However, the UE 532 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 5B, the RF signal 506 follows a LOS path between the base station 505 and the UE 532, and the reflected signal 534 represents the RF sensing signals that followed a NLOS path between the base station 505 and the UE 532 due to reflecting off the building 504 (or another target object). The base station 505 may have transmitted multiple RF sensing signals (not shown in FIG. 5B), some of which followed the LOS path and others of which followed the NLOS path. Alternatively, the base station 505 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 532 can determine the distance to the building 504. In addition, if the UE 532 is capable of receive beamforming, the UE 532 may be able to determine the general direction to the building 504 as the direction of the reflected signal 534, which is the RF sensing signal following the NLOS path as received. The UE 532 may then optionally report this information to the transmitting base station 505, an application server associated with the core network, an external client, a third-party application, or some other entity. Alternatively, the UE 532 may report the ToA measurements to the base station 505, or other entity, and the base station 505 may determine the distance and, optionally, the direction to the target object.

Note that if the RF sensing signals are uplink RF signals transmitted by the UE 532 to the base station 505, the base station 505 would perform object detection based on the uplink RF signals just like the UE 532 does based on the downlink RF signals.

Figure 5C:
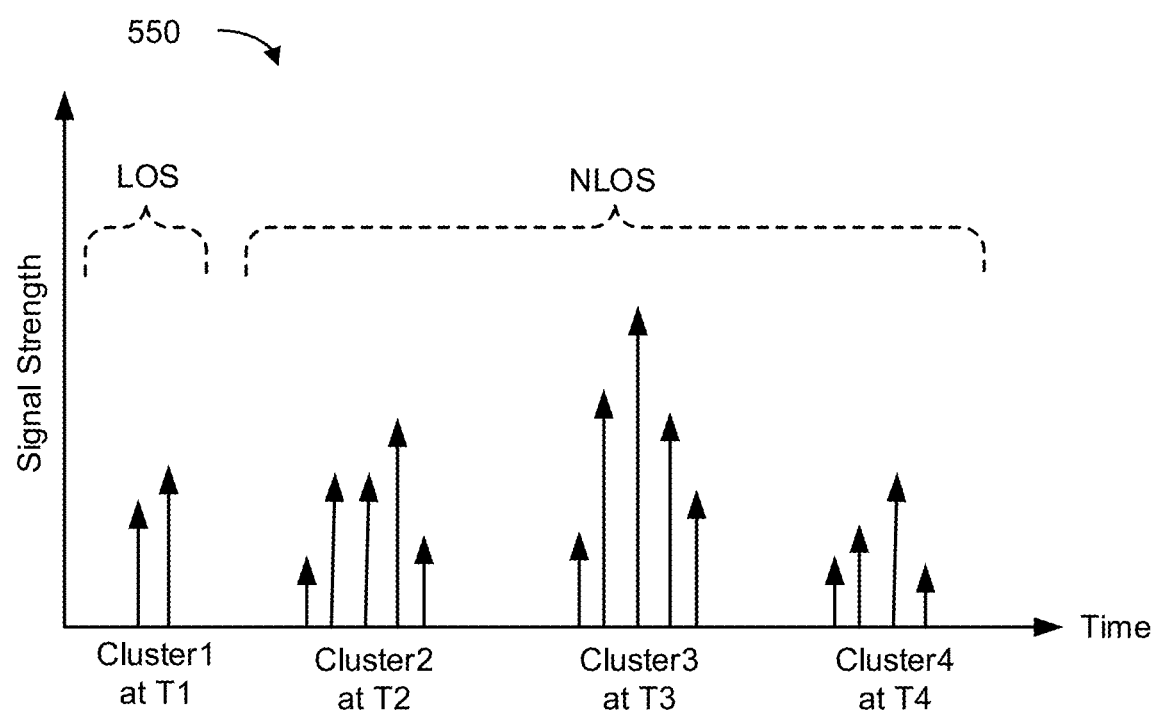
FIG. 5C is an example graph showing a radio frequency (RF) channel response over time.

Referring to FIG. 5C, an example graph 550 showing an RF channel response at a receiver (e.g., any of the UEs or base stations described herein) over time is shown. In the example of FIG. 5C, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5C, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5C, because the first cluster of RF signals at time T1 arrives first, it is presumed to be the LOS data stream (i.e., the data stream arriving over the LOS or the shortest path), and may correspond to the LOS path illustrated in FIG. 5B (e.g., the RF signal 506). The third cluster at time T3 is comprised of the strongest RF signals, and may correspond to the NLOS path illustrated in FIG. 5B (e.g., the reflected signal 534). Note that although FIG. 5C illustrates clusters of two to five channel taps, as will be appreciated, the clusters may have more or fewer than the illustrated number of channel taps.

Figure 6:
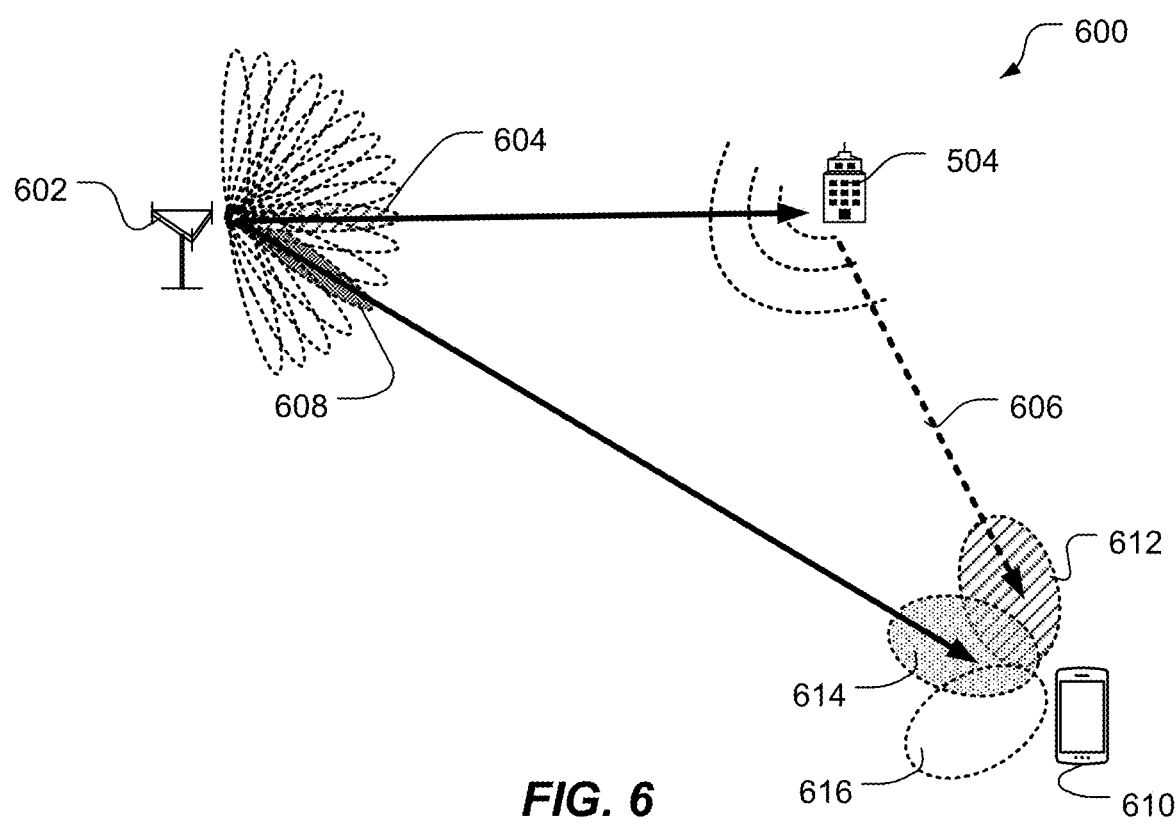
FIG. 6 illustrates an example single target beam management use case for bistatic radio frequency sensing.

Referring to FIG. 6, an example single target beam management use case 600 for bistatic radio frequency sensing is shown. The use case 600 includes a base station 602, such as a 5G NR gNB configured to transmit a plurality of beamformed signals along different azimuths and/or elevations, and a UE 610 configured to utilize receive beamforming to improve the gain of signals based on the angle of arrival. The base station 602 may be configured to generate N different reference beams and various azimuths, elevations, and/or beam widths. In an example the beams transmitted by the base station 602 may be based on SS Blocks, CSI-RS, TRS, or PRS resource sets. Other sensing and tracking reference signals may also be used. The UE 610 may be configured to utilize phase shifters and other software and hardware techniques to generate receive beams such as a first receive beam 612, a second receive beam 614, and a third receive beam 616. The UE 610 may also be configured to utilize beam forming for transmitted beams. The base station 602 may transmit a first reference signal 604 in the direction of a target object, such as the building 504, which may be reflected and the UE 610 may receive a reflected signal 606 with the first receive beam 612. The reflected signal 606 represents a NLOS path of the first reference signal 604 to the UE 610. The base station 602 also transmits a second reference signal 608 on a second beam. In an example, the second reference signal 608 may be quasi co-located (QCLed) with the first reference signal 604. The UE 610 receives the second reference signal 608 with the second receive beam 614. The second reference signal 608 is a LOS path to the UE 610.

In operation, the UE 610 may be configured to report the channel responses for each of the first and second reference signals 604, 608 to the base station 602 or another serving cell, and the base station 602 may be configured to manage the transmit beam and receive beam pairs for object sensing. For example, the base station 602 may be configured to provide transmit and receive beam identification information to the UE 610 to track an object such as the building 504. The beam identification information may be a transmission configuration indicator (TCI) sent in a DCI message which includes configurations such as QCL relationships between the transmit and receive beams.

Figure 7:
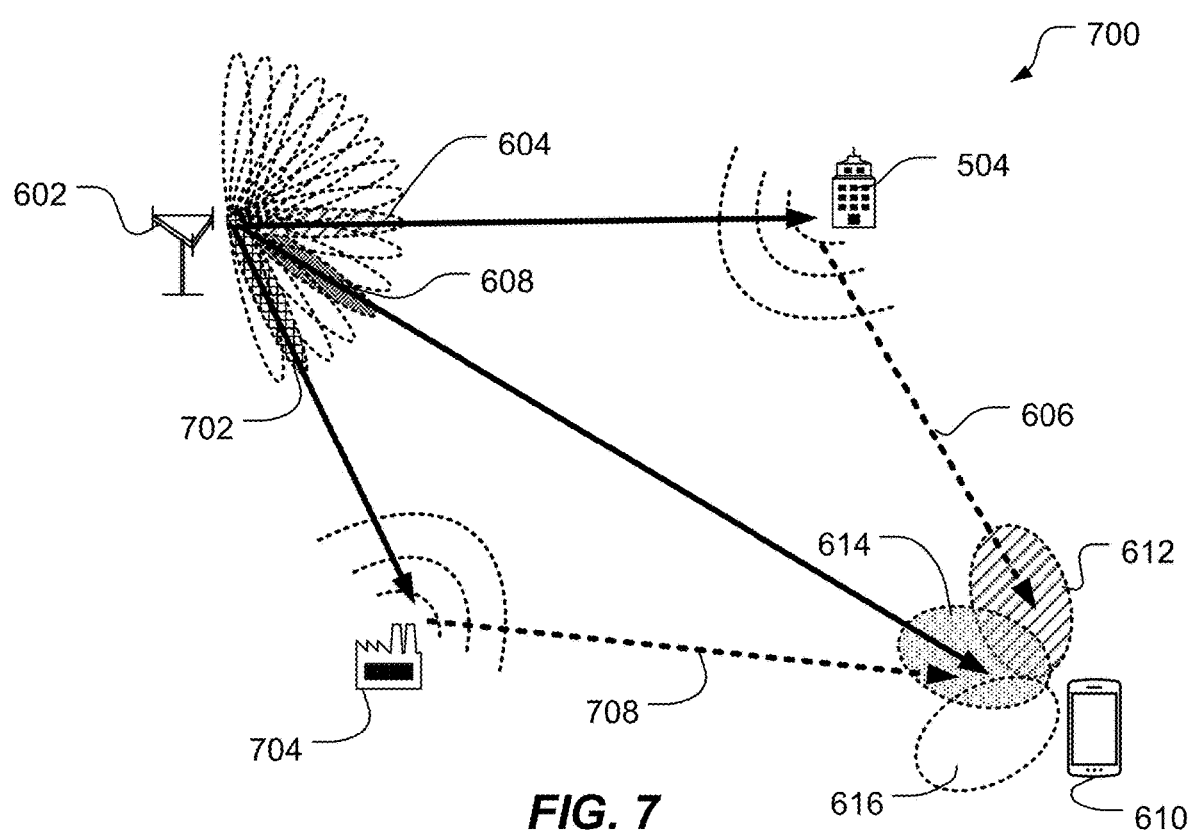
FIG. 7 illustrates an example multi-target beam management use case for bistatic radio frequency sensing.

Referring to FIG. 7, with further reference to FIG. 6, an example multi-target use case 700 for bistatic radio frequency sensing is shown. The use case 700 extends the single target use case 600 of FIG. 6 by including a second target. The second target may be a second building 704 as an example and not a limitation. The number and nature of the targets may vary based on the environment and the radio sensing application. In the use case 700, the base station 602 transmits a third reference signal 702 which is reflected by the second building 704, and the resulting reflected signal 708 is detected by the second receive beam 614 of the UE 610. The UE 610 may report the channel response for the third reference signal 702 with an indication that the measurement was obtained with the second receive beam 614. The base station 602 is configured to manage the beam pairs (i.e., the third reference signal 702, and the second receive beam 614) associated with the second target. Additional targets and the corresponding beam pairs may also be managed by the base station 602. The base station 602 may be configured to track one or more of the targets and thus may provide the corresponding beam pair information to the UE 610 as QCL/TCI for the respective targets.

Figure 8A:
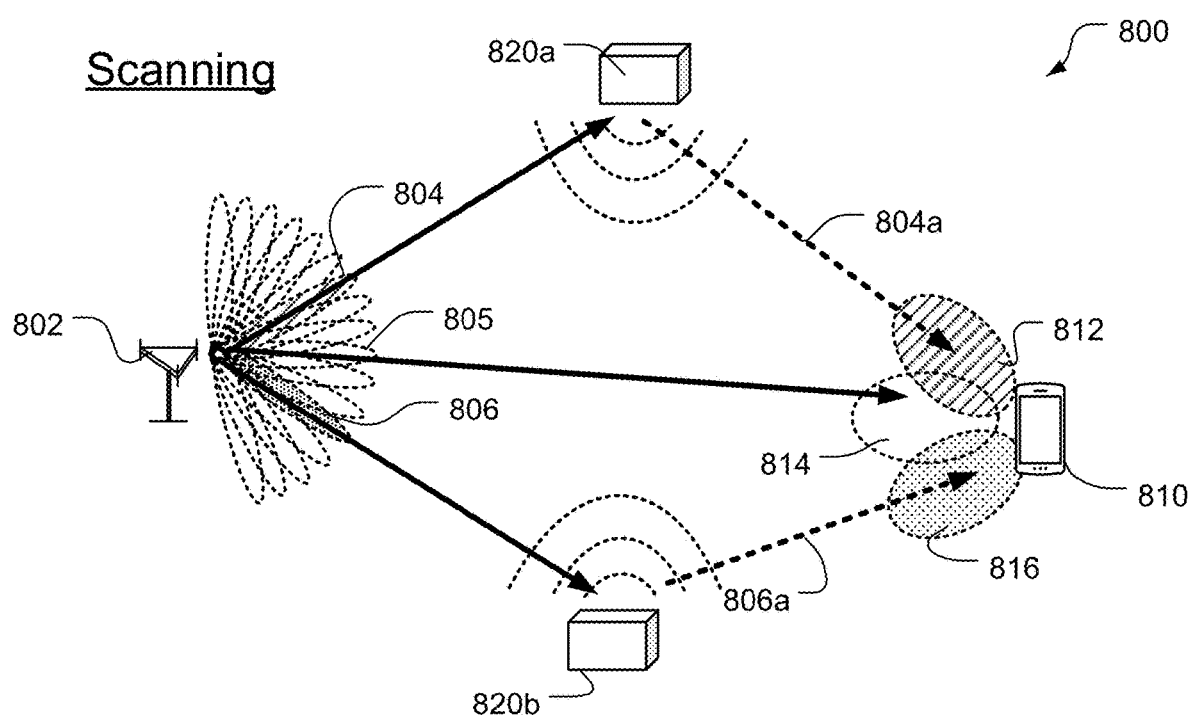
FIG. 8A illustrates an example scanning phase with bistatic radio frequency sensing.

Referring to FIG. 8A, an example scanning phase 800 with bistatic radio frequency sensing is shown. A base station 802 is an example of the base station 304 and is configured to transmit a plurality of beamformed reference signals at varying azimuths, elevations and/or beam widths. The reference signals may be SS Blocks, CSI-RS, TRS, PRS, or a sensing-scanning reference signal (SSRS) configured for RF sensing applications. A UE 810 is an example of the UE 302 and may be configured to perform receive beam scanning along different azimuths, elevation and/or beam widths relative to the orientation of the UE 810. In operation, the base station 802 may transmit one or more of the reference signals in a sequential order (i.e., beam sweeping), and the UE 810 is configured to beam sweep through different receive beams. The scanning phase 800 may be used to initially detect potential objects to be tracked via RF sensing. For example, a first reference signal 804 may be reflected by a first object 820a and a first reflected reference signal 804a may be detected by the UE 810. The UE 810 may cycle through different receive beams, such as a first receive beam 812, a second receive beam 814, and a third receive beam 816. As depicted in FIG. 8A, the first reflected reference signal 804a may be received with the first receive beam 812. The UE 810 may also detect a second reference signal 805 via a LOS path with the second receive beam 814. The beam sweeping on the base station 802 may generate a third reference signal 806 which is reflected on a second object 820b and a third reflected reference signal 806a is received by the UE 810 on the third receive beam 816.

In an embodiment, the UE 810 may be configured to detect a target based on the RSRP of the received signals. For example, the UE 810 may report that the RSRP values associated with the first reference signal 804 and the third reference signal 806 are above a threshold value. The threshold value may be a fixed value, or it may be scaled based on the RSRP of a LOS signal, such as the second reference signal 805. The UE 810 is configured to report one or more channel measurements (e.g., RSRP, RSRQ, SINR) associated with the received reference signals to the base station 802, or other network node. The measurements obtained during the scanning phase 800 may be used for a subsequent tracking phase.

Figure 8B:
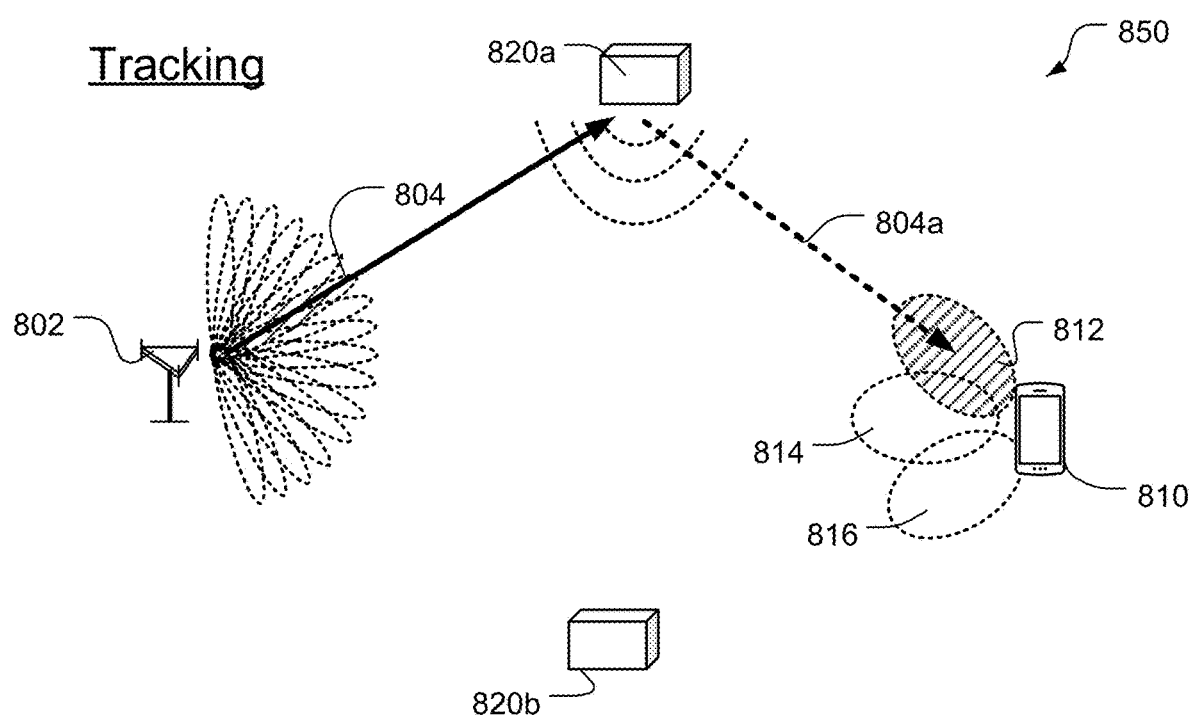
FIG. 8B illustrates an example tracking phase with bistatic radio frequency sensing.

Referring to FIG. 8B, with further reference to FIG. 8A, an example tracking phase 850 with bistatic radio frequency sensing is shown. Continuing the example of FIG. 8A, the base station 802 (or another network node in the communication system 100) may determine to track one or more of the objects detected in the scanning phase 800. For example, the base station 802 may select to track the first object 820a and will send beam configuration information to the UE 810 to enable the UE 810 to track the first object 820a. The beam configuration information may include reference signal information and receive beam configuration information for the UE 810. The base station 802 may utilize a sensing-tracking reference signal (STRS) based on the first reference signal 804 to track or refine the measurements associated with the first object. In an example, the STRS may be QCLed with a corresponding SSRS (i.e., the first reference signal 804). SS Block, CSI-RS, TRS and PRS may be used as STRS. Other reference signals may also be developed and used as the STRS. The beam configuration information sent to the UE 810 may be sent via RRC, Medium Access Control Control Element (MAC-CE), DCI, or other signaling protocols. Upon receipt of the beam configuration information, the UE 810 may for example, use the first receive beam 812 with the STRS to detect the first object 820a.

The base station 802 may be configured to track multiple targets based on the number of reference signals the base station 802 may generate. In an embodiment, the base station 802 may be configured to track one object for each reference signal. For example, the base station 802 may track the second object 820b by generating a second STRS based on the third reference signal 806. The beam configuration information sent to the UE 810 may include the beam parameters for the second STRS and the corresponding receive beam information (e.g., the third receive beam 816) provided by the UE 810 during the scanning phase 800. Thus, the UE 810 may be configured to track both the first object 820a and the second object 820b. Additional objects, up to the number of reference signals generated by the base station 802, may be tracked.

Figure 9:
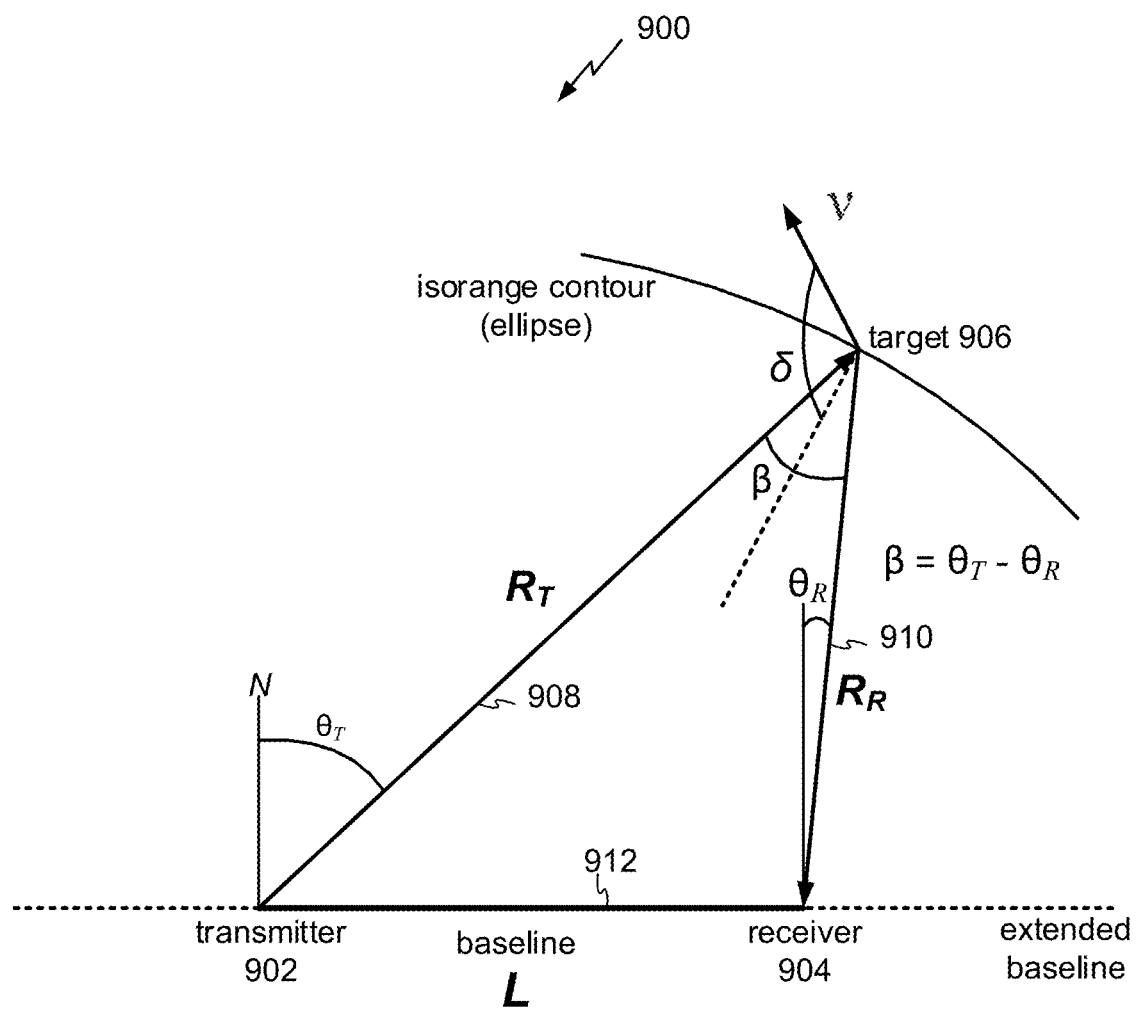
FIG. 9 is a simplified diagram showing the basic operation of a bistatic radar system.

FIG. 9 is a simplified diagram showing the basic operation of a bistatic radar system 900. A transmitter 902 and a receiver 904 are used to send and receive radar signals for sensing a target 906. While a bistatic radar example is shown, the same principals of operation can be applied to a multi-static radar, which utilizes more than two transmitter(s)/receiver(s). For example, a multi-static radar may utilize one transmitter and two receivers. In another example, a multi-static radar may utilize two transmitters and one receiver. Larger numbers of transmitters and/or receivers may also be possible.

In bistatic radar system 900, the transmitter 902 sends a transmit signal 908 which traverses a distance RT to reach target 906. The transmit signal 908 reflects from the target 906 and becomes an echo signal 910 which traverses a distance RR to reach the receiver 904. A primary function served by bistatic radar system 900 is sensing the range, or distance RR, from the target 906 to the receiver 904. The system determines the range RR primary by sensing the amount of time taken for the transmit signal 908 and echo signal 910 to traverse the total distance $R_{sum}$, which is the sum of RT and RR:

$$R_{sum} = R_T + R_R \tag{Eq. 1}$$

The total distance $R_{sum}$ defines an ellipsoid surface (also known as the iso-range contour) with foci at the locations of the transmitter 902 and the receiver 904, respectively. The ellipsoid surface represents all the possible locations of the target 906, given the total distance $R_{sum}$. The radar system 900 is capable of measuring the distance $R_{sum}$. For example, if perfect synchronization of timing between the transmitter 902 and the receiver 904 can be assumed, it would be easy to simply measure the time duration $T_{sum}$ between moment when the transmitter 902 sent the transmit signal 908 and moment when the receiver 904 received the echo signal 910.

Multiplying the time duration $T_{sum}$ by the speed of the signal through free space, e.g., approximately $c=3*10^8$ meters/second, would yield $R_{sum}$. Thus, the ellipsoid surface of all possible locations of the target 906 can be found by measuring the "flight time" $T_{sum}$ of the bistatic radar signal.

According to some embodiments, the distance $R_{sum}$ can be measured without tight time synchronization between the transmitter 902 and the receiver 904. In one embodiment, a line-of-sight (LOS) signal 912 can be sent from the transmitter 902 to the receiver 904. That is, at the same time that transmitter 902 sends the transmit signal 908 toward the target 906, transmitter 902 may also send the LOS signal 912 toward the receiver 904. According to a specific embodiment, the transmit signal 908 may correspond to a main lobe of a transmit antenna beam pattern emitted from the transmitter 902, while the LOS signal 912 corresponds to a side lobe of the same transmit antenna beam pattern emitted from transmitter 902.

The receiver 904 receives both the echo signal 910 and the LOS signal 912 and can utilize the timing of the reception of these two signals to measure the total distance $R_{sum}$, using the expression:

$$R_{sum} = (T_{Rx\_echo} - T_{RxLos})*c + L \quad \text{(Eq. 2)}$$

Here, TRx_echo is the time of reception of the echo signal 910. TRxLOS is the time of reception of the LOS signal 912. As mentioned, $c=3*10^8$ meters/second is the speed of the signal through free space. L is the distance between the transmitter 902 and the receiver 904. Once $R_{sum}$ is found, it can be used to calculate the target range RR, i.e., the distance between the target 906 and the receiver 904, using the following expression:

$$R_R = \frac{R_{sum}^2 - L^2}{2(R_{sum} + L*\sin\theta_R)} \quad \text{(Eq. 3)}$$

The bistatic radar system 900 can also be used to determine the angle of arrival (AoA) $\theta_R$ at which the echo signal 910 is received by receiver 904. This can be done in various ways. One way is to estimate OR by using an antenna array at the receiver 904. An antenna array, which comprises multiple antenna elements, can be operated as a programmable directional antenna capable of sensing the angle at which a signal is received. Thus, the receiver 904 may employ an antenna array to sense the angle of arrival of the echo signal 910. Another way to estimate OR involves multilateration. Multilateration refers to the determination of the intersection of two or more curves or surfaces that represent possible locations of a target. For example, the bistatic radar system 900 shown in FIG. 9 can define a first ellipsoid surface representing possible locations of the target 906, as described previously. A second bistatic radar system with a differently located transmitter and/or receiver can define a second, different ellipsoid surface that also represents the possible locations of the target 906. The intersection of the first ellipsoid surface and the second ellipsoid surface can narrow down the possible location(s) of the target 906. In three-dimensional space, four such ellipsoid surfaces would generally be needed to reduce the possible location to a single point, thus identifying the location of target 906. In two-dimensional space (e.g., assuming all transmitters, receivers, and the targets are confined to the being on the ground), three such ellipsoid surfaces (for two-dimensional space, the ellipsoid surfaces reduce to elliptical curves) would generally be needed to reduce the possible locations to a single point, thus identifying the location of target 906. Multilateration can also be achieved in a similar manner using multi-static radar system instead of multiple bistatic radar systems.

Furthermore, the bistatic radar system 900 can also be used to determine the Doppler frequency associated with the target 906. The Doppler frequency denotes the relative velocity of the target 906, from the perspective of the receiver 904—i.e., the velocity at which the target 906 is approaching/going away from the receiver 904. For a stationary transmitter 902 and a stationary receiver 904, the Doppler frequency of the target 906 can be calculated as:

$$f_D = \frac{2v}{c} * \cos\delta * \cos(\beta/2) \quad \text{(Eq. 4)}$$

Here, $f_D$ is the Doppler frequency, v is the velocity of the target 906 relative to a fixed frame of reference defined by the stationary transmitter 902 and receiver 904. β is the angle formed between the transmit signal 908 and the echo signal 910 at the target 906. δ is the angle between the velocity vector v and the center ray (half angle) defined within angle β.

In FIG. 9, a fixed frame of reference is defined with respect to the stationary transmitter 902 and stationary receiver 904. Specifically, a baseline of length L can be drawn between the transmitter 902 and the receiver 904. The baseline can be extended beyond the transmitter 902 and receiver 904. One or more normal lines can be drawn as being perpendicular to the baseline. A transmit angle $\theta_T$ can be defined relative to a normal line drawn from the location of the transmitter 902. A receive angle $\theta_R$, referred to above as the angle of arrival, can be defined relative to a normal line drawn from the location of the receiver 904.

As mentioned previously, bistatic radar system 900 can be operated to sense a target in two-dimensional space or three-dimensional space. An additional degree of freedom is introduced in the case of three-dimensional space. However, the same basic principles apply, and analogous calculations may be performed.

Figure 10:
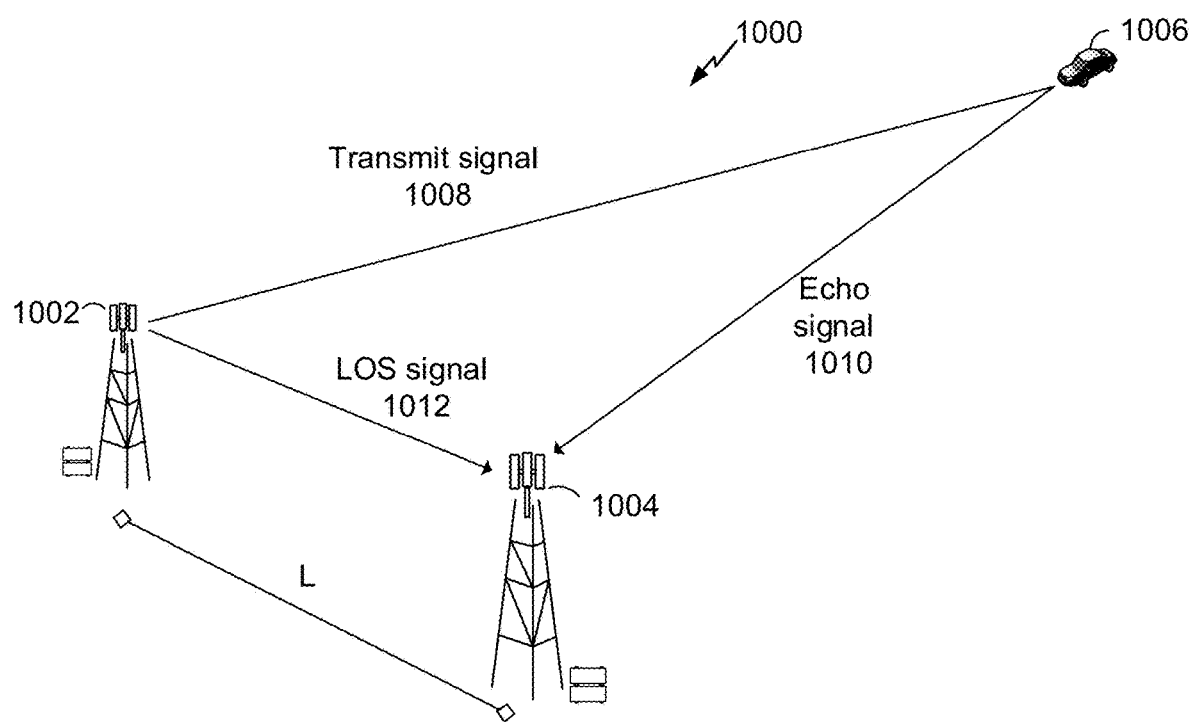
FIG. 10 illustrates the implementation of a bistatic radar system in a wireless communications system, according to an embodiment of the disclosure.

FIG. 10 illustrates the implementation of the bistatic radar system 900 in a wireless communications system, according to an embodiment of the disclosure. The wireless communications system may comprise a wireless communication system 1000, as shown in FIG. 10. The wireless communications system 1000 may comprise numerous Transmission Reception Points (TRPs), which provide transmission and/or reception of signals with other devices. Examples of TRPs within the wireless communications system 1000 include base stations 1002 and 1004, which serve to provide wireless communications for user equipment (UE) such as vehicles, wireless phones, wearable device, personal access points, and a plethora of other types of user devices in the vicinity that require wireless data communications. For instance, base stations 1002 and 1004 may be configured to support data communications with a UE device, by transmitting data symbols to or receiving data symbols from the UE device. Resources within the wireless communication system 1000, such as base station 1002 and 1004, may thus be utilized to serve "double duty" to support not only wireless communication operations but also bistatic and/or multi-static radar operations. The wireless communications system 900 may be a cellular communications system For example, base stations 1002 and base station 1004 may serve as the transmitter 902 and receiver 904, respectively, of the bistatic radar system 900 shown in FIG. 9. Base station 1002 may transmit the transmit signal 1008, which reflects from target 906 and becomes the echo signal 1010 received by the base stations 1004. The base station 1004 may also receive a line-of-sight (LOS) signal 1012 from the base station 1002. By receiving both the LOS signal 1012 and the echo signal 1010, the RX base station 1004 can measure the value associated with the time difference between the reception times TRx_echo and TRxLOS associated with the reception of the LOS signal 1012 and the echo signal 1010, respectively. For example, the RX base station 1004 may cross-correlate the received LOS signal 1012 with the received echo signal 1010, such as by mixing the two signals in analog or digital form, to yield a value representative of the time difference (TRx_echo−TRxLOS). The time difference can be used to find the total distance $R_{sum}$. The total distance $R_{sum}$ can then be used to define an ellipsoid surface, which along with other information may be used to find the target range RR, angle of arrival (AoA) $\theta_R$, and/or Doppler frequency associated with the target 1006, using one or more techniques discussed previously with respect to FIG. 9.

Here, target 906 may be, but does not have to be, a UE that is being supported by the wireless communications system 1000. In some instances, target 906 may be a UE that is configured to transmit and receive wireless signals carrying voice, text, and/or wireless data using the base stations of wireless communications system 1000. In other instances, target 906 may simply be a remote object that is within the bistatic radar range of base station 1002 and base station 1004 but otherwise has nothing to do with the wireless communications functions of system 1000.

In the bistatic example shown in FIG. 10, the transmitter is referred to as the TX base station 1002, and the receiver is referred to as the RX base station 1004. More generally, TX base station 1002 may be referred to as a TX TRP, and RX base station 1004 may be referred to as a RX TRP. Here "TX" and "RX" merely refer to the fact that base station 1002 is used to transmit the radar transmission signal 1008, and the base station 1004 is used to receive the radar echo signal 1010. The terms "TX" and "RX" in this context do not limit the operation of the base stations 1002 and 1004 to serve other functions, e.g., to serve as transmitter and/or receiver in other bistatic or multi-static radar operations (beyond what is illustrated in FIG. 9) or as base stations transmitting and receiving data communications in the normal operation of the wireless communications system 1000. While FIG. 10 illustrates a simple bistatic radar system, a multi-static radar system may also be implemented within a wireless communications system in a similar manner. Also, while FIG. 10 illustrates a simple example in two-dimensional space, the same operations can be extended to three-dimensional space.

Implementing a bistatic or multi-static radar system within a wireless communications system according to embodiments of the present disclosure may yield numerous benefits. One particular benefit is the flexible utilization of bandwidth allocated for wireless communications. An example of the wireless communications system 1000 is a cellular communications system. For example, according to one embodiment, the wireless communications system 1000 may conform to the "5G" standard introduced in the release 15 version of the 3rd Generation Partnership Project (3GPP) specifications. Ever increasing bandwidth allotted to present and future wireless communications systems, including 5G and 5G beyond, may be leveraged for the transmission of bistatic and multi-static radar signals. Thus, radio frequency (RF) sensing (e.g. radar) may be enabled by utilizing available wireless RF spectrum resource. For example, one or more of the transmit signal 1008, echo signal 1010, and/or LOS signal 1012 may occupy bandwidth within a portion of radio frequency (RF) spectrum allocated to the wireless communications system 1000 for data communications. Another example of the wireless communications system 1000 is a Long-Term Evolution (LTE) wireless communications system. Other examples of the wireless communications system 1000 include a wireless local area network (WLAN), a wireless wide area network (WWAN), a small cell-based wireless communications system, a millimeter wave-based (mmwave-based) communications system, and other types of communications based systems that include TRPs.

Also, the inherent benefits of bistatic and multi-static radar systems can be realized by an existing, widespread network of well-positioned transmitters and receivers, in the form of wireless base stations. Compared with a monostatic radar system, a bistatic or multi-static radar system mitigates against self-interference by having physically separated transmitter equipment and receiver equipment. Wireless base stations, such as base stations 1002 and 1004 shown in FIG. 10, already exist and cover vast geographic areas where users, vehicles, and other objects of interest are likely to appear. Such wireless base stations are well-dispersed, and as a result, provide opportunities for the selection of appropriately located base stations to serve as transmitters and receivers for bistatic and multi-static radar operations.

A significant challenge posed in the development of a bistatic or multi-static radar system is the coordination between transmitter(s) and the receiver(s). Various techniques addressing such coordination issues are presented with embodiments of the present disclosure, as discussed in sections below.

According to certain embodiments, a "radar controller" may be implemented to support the operations of one or more bistatic and/or multi-static radar systems implemented within a wireless communications system. Here, a "radar controller" is may be realized as a combination of hardware and/or software resources that reside within the wireless communications network. Thus, the radar controller may be defined as a functional block, facility, or node that serves to, for example, configure and/or control parameters relied upon by TX and RX base stations involved in bistatic and/or multi-static radar operations.

Figure 11:
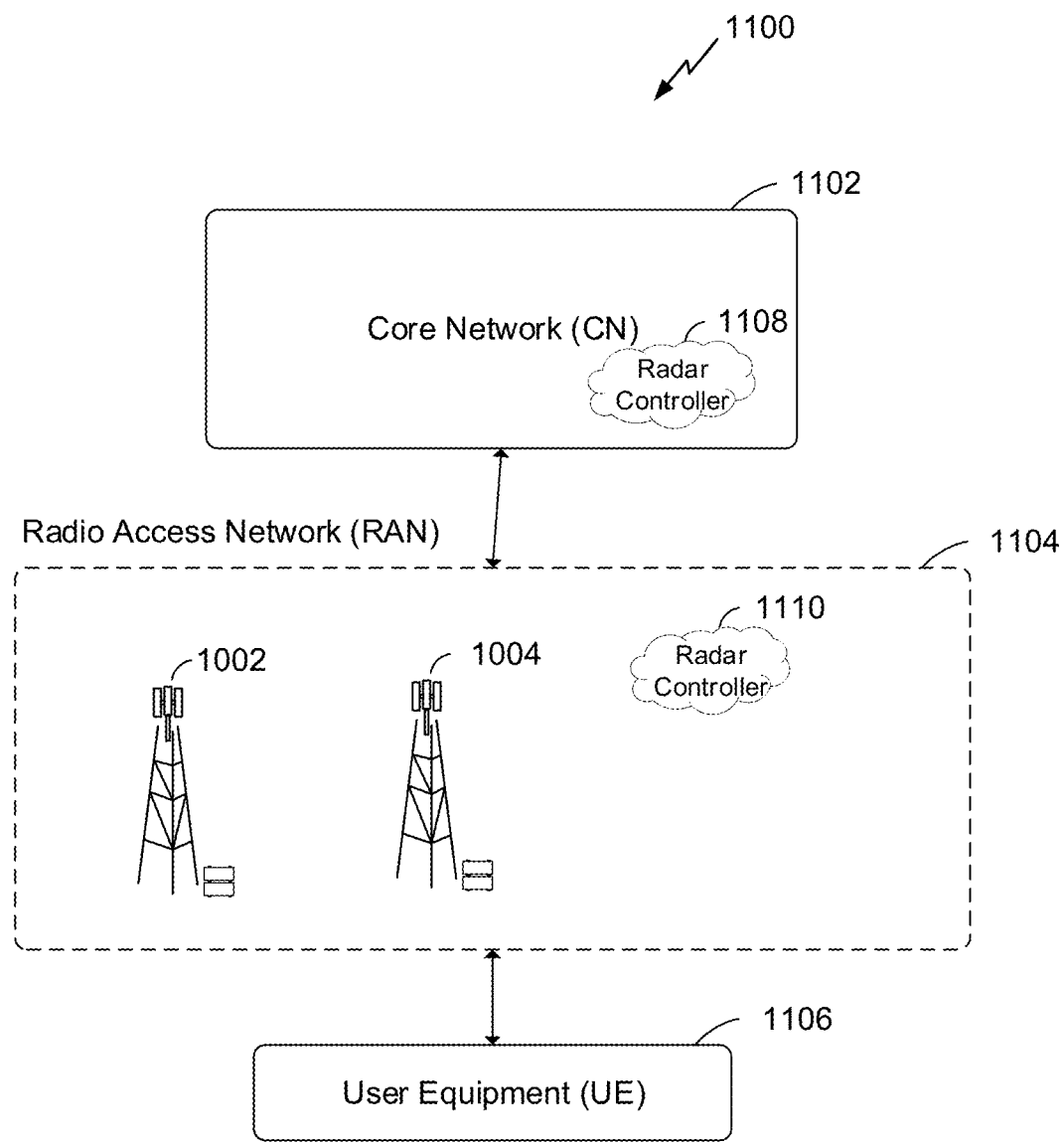
FIG. 11 is a block diagram of a wireless communication system that may include a radar controller, according to an embodiment of the disclosure.

FIG. 11 is a block diagram of a wireless communication system 1100 that may include a radar controller, according to an embodiment of the disclosure. Wireless communications system 1100 comprises a core network (CN) 1102, a radio access network (RAN) 1104, and one or more user equipment (UE) 1106. In one embodiment, a radar controller 1108 may be implemented within the CN 1102. The CN 1102 provides system 1100 with connectivity to the Internet and to application services. The CN 1102 may be implemented with various computing resources, which may include memory and one or more processors executing an operating system and executing applications comprising programmed instructions. In a specific embodiment, the radar controller 1108 may be implemented within the computing resources of the CN 1102.

In another embodiment, a radar controller 1110 may be implemented within the RAN 1104. For example, RAN 1104 may comprise base stations 1002-1004. Each of the base stations 1002-1004 may comprise transmitter and receiver hardware such as antennas, antenna elements, cabling, a physical tower structure, modems, encoder/decoders, networking equipment, computing resources, and other components. The computing resources associated with each base station may include memory and one or more processors executing a operating system and executing applications comprising programmed instructions. In a specific embodiment, the radar controller 1110 may be implemented within the computing resources of one or more of the base stations 1002-1004.

The radar controller 1108 (or 1110) may be implemented in the radio access network (RAN), core network (CN) 1102, or elsewhere in a wireless communications system, e.g., cellular communications system 1100. The radar controller 1108 (or 1110) does not have to be dedicated server. For example, the radar controller 1108 (or 1110) can be a generic server, a positioning server, an assisted driver server, a tracker server, or another server providing a different functionality. Furthermore, the radar controller 1108 (or 1110) can be, but does not have to be, operated or owned by the network operator. The radar controller 1108 (or 1110) can be a network independent server (e.g. third party server).

Wherever it is implemented, the radar controller 1108 (or 1110) may be communicatively coupled, via one or more interfaces, to the transmission reception points (TRPs), e.g., base stations 1002 and 1004, within the RAN 1104. The one or more interfaces may comprise point-to-point interfaces. An example of such a point-to-point interface is an interface implementing an Internet Protocol (IP) communication protocol over a wired network (e.g., "backhaul" network).

In certain embodiments, the wireless communications system 1100 may conform to "5G" standards. In such cases, the CN 1102 may be a 5G core network (5G CN), the RAN 1104 may be a 3GPP Next Generation Radio Access Network (NG RAN), and each of the base stations 1002 and 1004 may be a "gNodeB" or "gNB."

Figure 12:
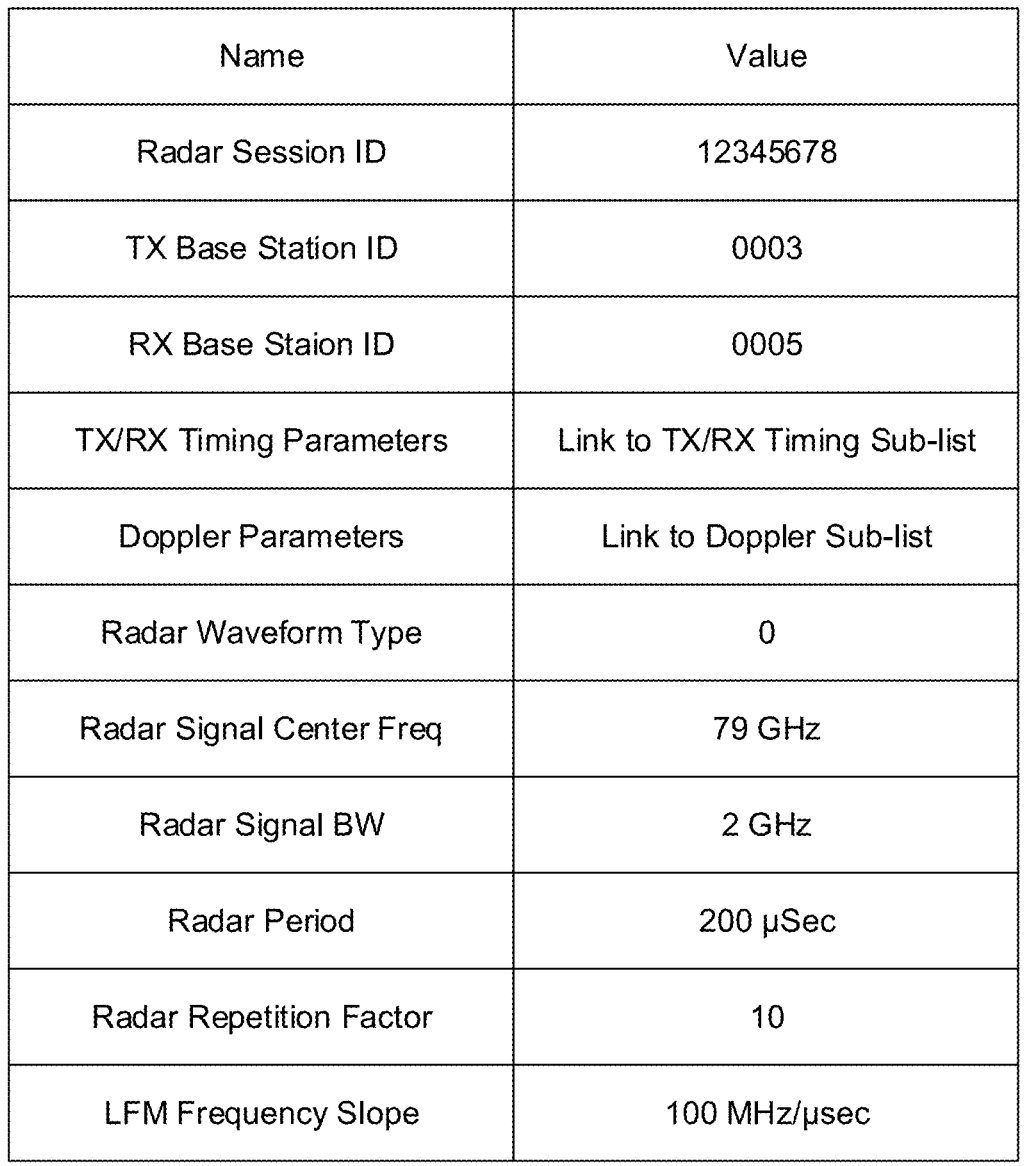
FIG. 12 shows an example of a radar configuration parameters list provided by the radar controller to a TX base station and a RX base station for a bistatic or multi-static radar measurement session, according to an embodiment of the disclosure.

FIG. 12 shows an example of a radar configuration parameters list 1200 provided by the radar controller 1108 (or 1110) to the TX base station 1002 and the RX base station 1004 for a bistatic or multi-static radar measurement session, according to an embodiment of the disclosure. Here, a radar measurement session may comprise one or more radar signal transmissions/receptions associated with obtaining a range, Doppler, or angle estimation on a target. An example of such a radar measurement session may be a sequence of "chirps" of a frequency modulated continuous wave (FMCW) radar signal transmitted by the TX base station, with a corresponding sequence of echoed "chirp" of the FMCW radar signal received by the RX base station.

As shown in FIG. 12, the radar configuration parameters list 1200 may include a number of entries, which may include values for parameters such as Radar Session ID, TX Base Station ID, RX Base Station ID, TX/RX Timing Parameters, Doppler Parameters, Radar Waveform Type, Radar Signal Center Frequency, Radar Signal Bandwidth (BW), Radar Period, Radar Repetition Factor, and linear frequency modulation (LFM) frequency slope. These parameters are presented for illustrative purposes, and entries in a configuration parameters list of any given radar system implemented within a wireless communications system may vary from the example shown in FIG. 12.

Referring again to FIG. 12, the Radar Session ID identifies a particular radar measurement session. The TX Base Station ID identifies a particular base station in the wireless communications system, as the transmitter of the radar transmit signal. The RX Base Station ID identifies a particular base station in the wireless communications system, as the receiver of the radar echo signal reflected from the target. The example shown in FIG. 12 assumes a basic bistatic radar measurement session, using one transmitter and one receiver. IDs for additional transmitter(s) and/or receiver(s) may be included for a multistatic radar measurement session. TX/RX Timing Parameters may contain multiple entries and comprise a sub-list (described in more detail in later sections). A link or pointer may be provided to the sub-list. Similarly, Doppler Parameters may contain multiple entries and comprise a sub-list, for which a link or pointer may be provide. Radar Waveform Type specifies the type of waveform to be used. Different tuple values may correspond to different types of waveforms. Just as an example, the following values and corresponding waveforms may be provided:

"0"=FMCW
"1"=Position Reference Signal (PRS)
"2"=Single-sideband Modulation (SSB)
"3"=Tracking Reference Signal (TRS)
"4"=Demodulation Reference Signal (DMRS)
"5"=Channel State Information Reference Signal (CSI-RS)

Various waveforms may be selected. Some waveforms such as FMCW may be specifically associated with radar system operations. However, other waveforms such as PRS, SSB, TRS, DMRS, and CSI-RS may be associated with wireless system operations. Thus, waveforms already in existence in the wireless communications system may be opportunistically used as radar signal waveforms, in accordance with embodiments of the disclosure.

The radar controller 1108 (or 1110) may specify one or more parameters associated with a selected reference signal. The reference signal may be defined by selecting a wave form type, such as those listed above. In addition, the reference signal may be defined by specifying one or more other attributes. For instance, the radar configuration parameters list 1200 or other configuration parameters may be used to specify such attributes. Referring back to FIG. 12, the Radar Signal Center Frequency specifies the center frequency of the radar transmit signal. Just as an example, a center frequency of 79 GHz is shown in FIG. 12. Thus, the center frequency in this example fall within the spectrum allocated for the wireless communications system 1000 (e.g., within the 5G spectrum, which ranges from 300 MHz to 100 GHz). The center frequency of the radar echo signal may exhibit a Doppler shift away from the Radar Center Frequency. Such a Doppler shift is discussed in more detail in later sections. The Radar Signal Bandwidth (BW) specifies the bandwidth of the transmit radar signal. Just an example, a bandwidth of 2 GHz is shown in FIG. 12. The radar echo signal is expected to have the same bandwidth. The Radar Repetition Factor specifies the number of times a radar waveform may be repeated in the specified radar session, e.g., in Radar Session 12345678. In this example, the waveform is repeated 10 times. The LFM Frequency Slope specifies the slope, or rate of change, of the frequency of a linear frequency modulated (LFM) radar waveform. Here, the slope is 100 MHz/μsec. One type of LFM wave form is the FMCW waveform mentioned previously.

To summarize, the radar session specified in FIG. 12 may utilize an FMCW waveform that forms a "chirp" which is repeated 10 times, for a total duration of 200 μsec. Each chirp may have a duration of 20 μsec, during which the center frequency of the continuous wave (CW) signal is linearly increased, at a rate of 100 MHz/μsec, from 79 GHz to 81 GHz. Even though the CW signal has a very narrow bandwidth, the effective bandwidth of the entire sweep of the FMCW signal is 2 GHz. These and other characteristics of the reference signal, in this case an FMCW reference signal, may be specified as one or more parameters provided by the radar controller 1108 (or 1110).

Embodiments of the present disclosure can leverage the wireless communications system 1000 to estimate certain physical properties in the radar system. For example, the distance L between the TX base station 1002 and the RX base station 1004 is an important figure that may be useful in the calculation of the target range RR and other values. Resources available within the wireless communications system 1000 may provide different ways to determine L. One possibility is to use the known locations of the TX base station 1002 and the RX base station 1004. Such location information may be available, for example, in an almanac of collected physical descriptions available for all base stations within the wireless communications system 1000. Another possibility is to use GNSS (e.g., GPS) reports from base stations such as the TX base station 1002 and the RX base station 1004. Often, GNSS reports include the location of base stations. Using accurate longitudinal and latitude information available for the base station locations, the distance L between the TX base station 1002 and the RX base station 1004 can be calculated. Yet another possibility is to use inter-base stations positioning signals to obtain location fixes for TX base station 1002 and the RX base station 1004. For example, positioning signals such as Position Reference Signals (PRS) may be transmitted and received between base stations, according to positioning techniques available with New Radio/5G standards. Such inter-base station positioning signals may be used to determine position fixes for TX base station 1002 and the RX base station 1004, and the distance L between them can thus be determined.

FIG. 13 shows an example of a TX/RX Timing Sub-list 1300, according to embodiments of the disclosure. In one specific embodiment, the TX/RX Timing Sub-list 1300 may simply be incorporated as additional entries in the radar configuration parameters list 1200. In another specific embodiment, the TX/RX Timing Sub-list 1300 may be a separate but linked sub-list.

The timing parameters specified in the TX/RX Timing Sub-list 1300 relies on some level of timing synchronization between the TX base station 1002 and the RX base station 1004. Such TX/RX timing synchronization is important for numerous reasons. The performance of the radar system can be greatly improved if the RX base station 1004 starts "listening" at just the right time, i.e., upon arrival of the first expected signal, which may be either the LOS signal 1012 or the echo signal 1010 (or just shortly before such arrival). If the RX base station 1004 begins listening too early, the system would turn on equipment such as intermediate frequency (IF) receive hardware prematurely, wasting power and computational resource and increasing the probability of false alarm for the radar system. If the RX base station 1004 begins listening too late, the system might miss receiving the LOS signal 1012 or the echo signal 1010. If a certain level of timing synchronization between the TX base station 1002 and the RX base station 1004 can be achieved, then with knowledge of when the transmit signal 1008 is sent from the TX base station 1002, calculations can be made to predict the arrival time of the LOS signal 1012 or the echo signal 1010 at the RX base station 1004 (with some degree of acceptable uncertainty). That way, the RX base station 1004 can be controlled to start "listening" at just the right time, in order to reduce unnecessary waste of power and computational resources as well as minimize false alarms, while ensuring that the LOS signal 1012 and the echo signal 1010 are not missed.

Aspects of the present disclosure advantageously leverage the wireless communications system 1000 to meet such radar TX/RX timing synchronization requirements. For instance, the wireless communications system 1000 may comprise a 5G system (e.g., system 1100) that guarantees the timing synchronization error between any two base station to not exceed a certain amount of time. Just as an example, the 5G system may utilize orthogonal frequency division multiplexing (OFDM) signals for data communications and may guarantee that the timing synchronization error between any two base stations to not exceed the duration of a cyclic prefix (CP) of the OFDM signal. The CP is a guard band in time that separates consecutive data symbols and provides protection against inter-symbol interference (ISI). For a 60 kHz subcarrier channel, the CP duration may be 1.69 μsec, for example. Thus, the wireless communications system 1000 in this case may guarantee that the timing error between any two base stations would not exceed 1.69 μsec. With such a time synchronization guarantee, the radar controller 1108 (or 1110) may be able to more effectively control the timing of when the TX base station 1002 sends the transmit signal 1008 and when the RX base station begins to listen for the LOS signal 1012 and the echo signal 1010.

Referring back to FIG. 13, the TX/RX Timing Sub-list 1300 may comprise a Radar Session ID (discussed previously), a TX Transmission Time, an Expected Receive Time, and an Expected Receive Time Uncertainty. The radar controller 1108 (or 1110) may provide all or a relevant portion of the TX/RX Timing Sub-list 1300 to the TX base station 1002 and the RX base station 1004. For example, the radar controller 1108 (or 1110) may provide the TX Transmission Time, specified in this example as 20000.00 μsec, to the TX base station 1002. In response, the TX base station begins transmitting the transmit signal 1008 at time 20000.00 μsec. Just as an example, the value of "20000.00 μsec" may correspond the lapsed time since the last "tick" of a periodic reference event/signal used to synchronize timing across entities, e.g., all base stations and other equipment, within the wireless communications network 1000.

The radar controller 1108 (or 1110) may also provide the Expected Receive Time, specified in this example as 20133.33 μsec, to the RX base station 1002. The radar controller 1108 (or 1110) may be able to calculate the Expected Receive Time in different ways. In one embodiment, the Expected Receive Time may be estimated by assuming that the LOS signal 1012 is likely to arrive at the RX base station before the echo signal 1010, which is a valid assumption in many cases. Given that assumption, the Expected Receive Time may be estimated to be the TX Transmission time plus the amount of time that the LOS signal 1012 is expected to take to traverse the distance L:

$$\text{Expected Receive Time} = L/c + TX \text{ transmission Time} \quad \text{(Eq. 5)}$$

The radar controller 1108 (or 1110 may also provide the Expected Receive Time Uncertainty, specified in this example as a pair of values: [upper bound, lower bound]. The lower bound may simply be the negative of the network synchronization error. Just as an example, the network synchronization error may be 1.69 μsec. The upper bound may include two components. The first component of the upper bound may correspond to the signal propagation time associated with the maximum possible distance of a detectable target. In one embodiment, such a maximum distance L_Max may be specified as part of the link budget. Thus, the first component of the upper bound may be expressed as L_Max/c=L/c. The second component of the upper bound may simply be positive of the network synchronization error, which is specified as 1.69 μsec in the present example. Accordingly, the Expected Receive Time Uncertainty may be expressed as:

Expected Receive Time Uncertainty = (Eq. 6)

[lower bound, upper bound] =

[−network syn uncertainty, L_max/c + network syn error]

There can also be flexibility in the manner of specifying and communicating these and other configuration parameters. For example, to specify the upper bound of the Expected Receive Time Uncertainty, it may be sufficient for the radar controller 1108 (or 1110) to simply send the value of "L_max/c+network syn err" to the RX base station 1004, especially if the term L/c is already known locally at the RX base station 1004.

In response, the RX base station 1004 may begin "listening"—i.e., begin sensing the LOS signal 1012 and echo signal 1010—in the time window specified by:

Expected Receive Time + Expected Receive Time Uncertainty = (Eq. 7)

Expected Received Time + [lower bound, upper bound] =

[LC + TX Transmission Time − network syn uncertainty,

L_max/c + TX Transmission Time + network syn error]

The above illustrates the TX/RX timing parameters for one bistatic radar session which involves one TX base station and one RX base station. In practice, many such bistatic radar sessions (as well as multi-static radar sessions) may be specified in a similar manner. For each unique path L, i.e., unique pair of TX station and RX station, the radar controller 1108 (or 1110) may specify a different set of TX/RX timing parameters. In a simple multi-static case having one transmitter and multiple receivers, the unique pairs may share a common TX base station but have different RX base stations. In such a case, one TX Transmission Time and multiple sets of Expected Receive Time and Expected Receive Time Uncertainty may be specified.

Figure 14:
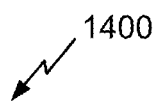
FIG. 14 shows an example of a Doppler sub-list, according to embodiments of the disclosure.

FIG. 14 shows an example of a Doppler Sub-list 1400, according to embodiments of the disclosure. In one specific embodiment, the Doppler Sub-list 1400 may simply be incorporated as additional entries in the radar configuration parameters list 1200. In another specific embodiment, the Doppler Sub-list 1400 may be a separate but linked sub-list.

The Doppler Sub-list 1400 mainly serves to estimate the Doppler shift and Doppler spread for the benefit of the RX base station 1004. As shown in FIG. 14, Doppler Sub-list 1400 may comprise a Radar Session ID (discussed previously), an Expected Doppler Shift value, and an Expected Doppler Spread value. The radar controller 1108 (or 1110) generally provides these frequency-domain parameters to enhance the performance of the RX base station 1004. It is possible that the target 906 may be moving quickly, which can introduce a large Doppler shift and/or Doppler spread. By providing the Doppler Sub-list 1400, the radar controller 1108 (or 1110) can dynamically configure the "expected Doppler shift" and "expected Doppler spread" assumed by the RX base station 1004.

For example, in an acquisition mode, the Doppler Sub-list 1400 may specify a larger value for the Expected Doppler Shift and Expected Doppler spread. This allows the RX base station 1004 to receive signals over a wider range of Doppler frequencies, which improves the detection rate. Just as an example, FIG. 14 shows an Expected Doppler Shift value specified as 80,000 m/sec and an Expected Doppler Spread specified as 10,000 m/sec.

By contrast, in a tracking mode, the Doppler Sub-list 1400 may specify more refined and narrow values. These values may be based on the history of measurements already taken. A set of more refined Doppler parameters may focus on a specific target. An instance of the Doppler Sub-list 1400 may be specified for each target being tracked. Thus, a particular RX base station 1004 may receive multiple Doppler Sub-lists 1400, corresponding to multiple targets.

The particular parameters shown in FIGS. 12, 13 and 14 are described for illustrative purposes. Depending on implementation, there may be deletion or addition of certain parameters, and different parameters may be specified all together. Nevertheless, configuration parameters for TX base station(s) and/or RX base station(s) in a bistatic or multi-static radar system may be provided by a radar controller that is positioned within an entity, such as a core network (CN) or a radio access network (RAN), in a wireless communications network, in accordance with embodiments of the disclosure.

Figure 15:
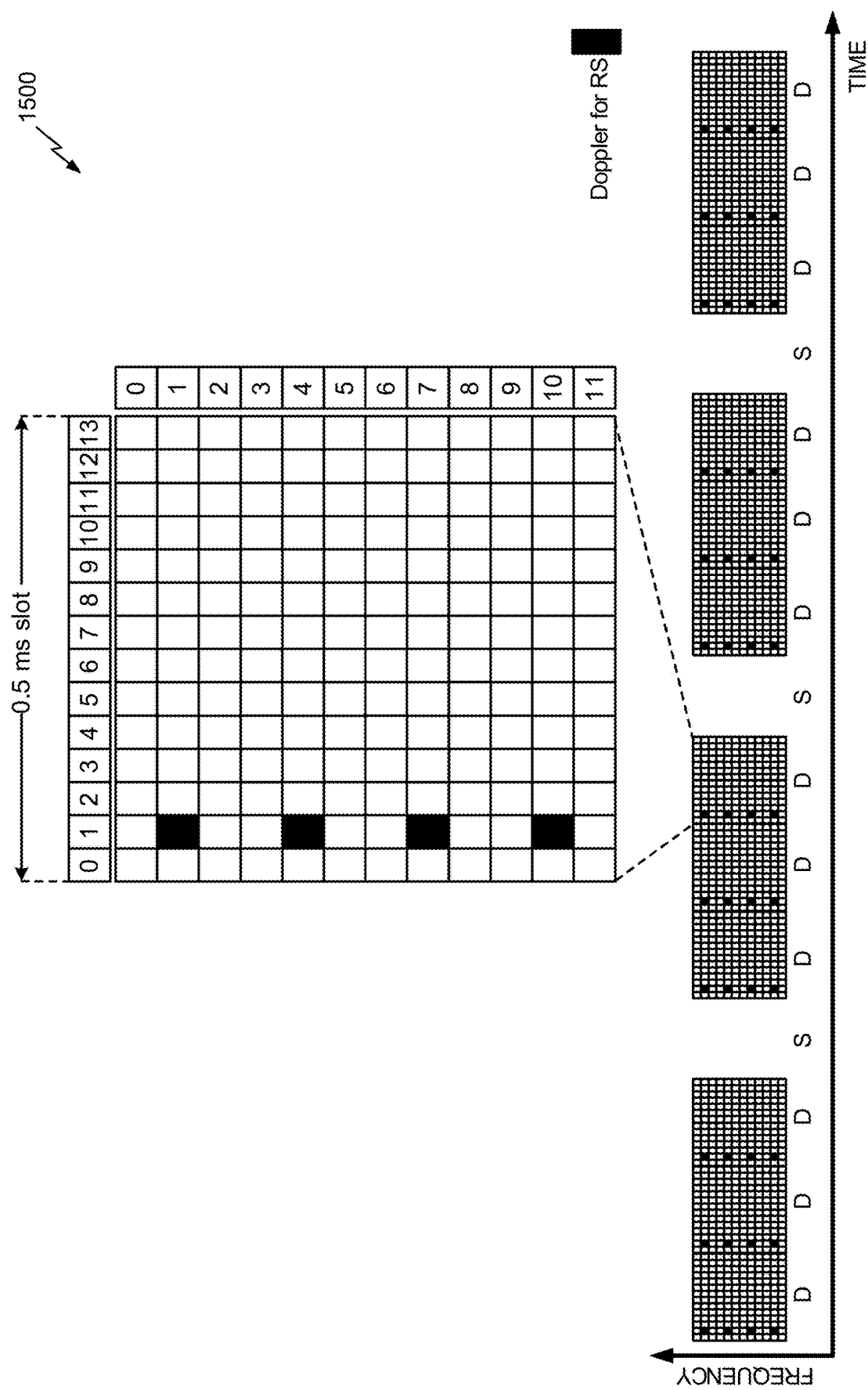
FIG. 15 illustrates a cellular reference signal resource configuration for Doppler estimation in accordance with an aspect of the disclosure.

FIG. 15 illustrates a cellular reference signal resource configuration 1500 for Doppler estimation in accordance with an aspect of the disclosure. In particular, cellular reference signal resource configuration 1500 is associated with observations of reference signals across sixteen (16) 0.5 ms slots, some of which correspond to a downlink "D" slot format, and some of which correspond to a special "S" slot format. Across X ms, the Doppler resolution may be characterized as 1000/X Hz. In the example of FIG. 15, the Doppler resolution is 125 Hz (e.g., X=8 ms across the sixteen 0.5 ms slots, and 1000/8=125), and the maximum resolvable Doppler is 2000 Hz (e.g., X=0.5 ms across a single 0.5 ms slot, and 1000/0.5=2000).

Implementation of RF radar signals that also function as reference signals (e.g., DL-PRS, CSI-RS, etc.) can be difficult to implement. For example, a radar signal for tracking a target may require a relatively long duration per occasion or instance (e.g., due to high pathloss on NLOS path to the Rx gNB). Radar signals in some designs may only be sporadically (e.g., aperiodically) available. Multiple targets may need to be tracked or detected in some designs, and delay estimation as well as Doppler estimation may be coupled.

In terms of slot configuration, multistatic radar signals may be communicated using downlink (DL) slot, an uplink (UL) slot, or a flexible (FL) slot. In some designs, the Tx gNB that transmits the multistatic radar signals may use a DL slot, while the Rx gNB that receives and measures the multistatic radar signals may use a UL slot.

Figure 16:
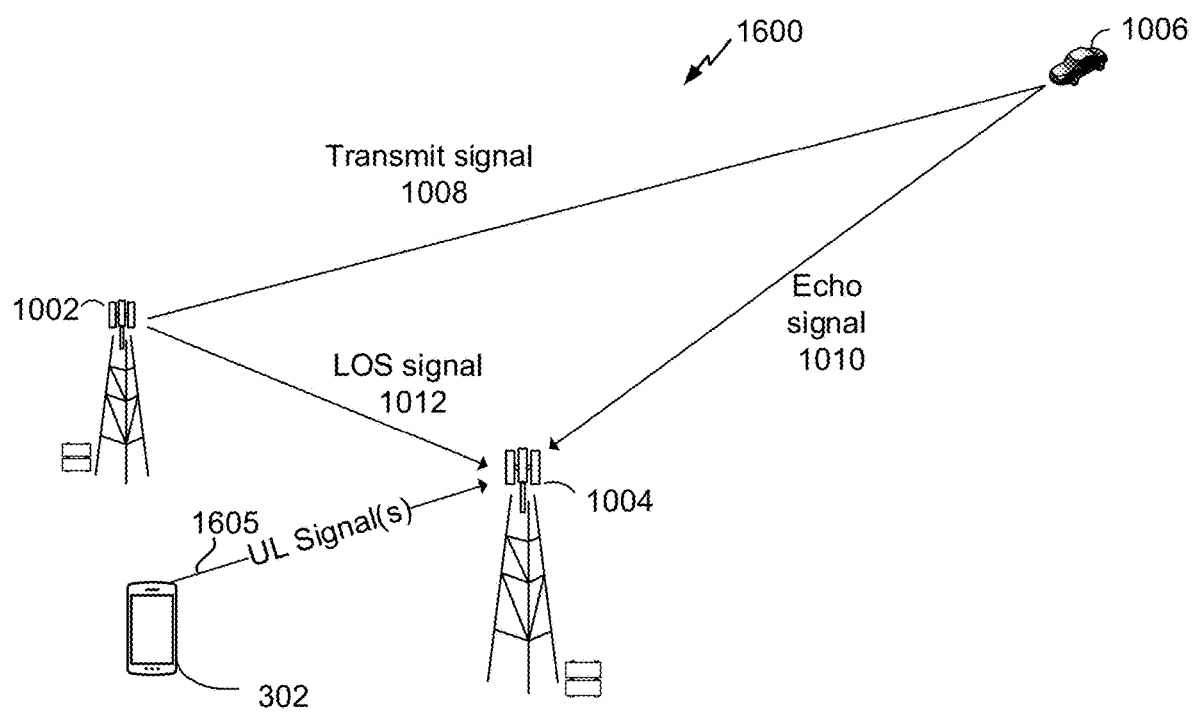
FIG. 16 illustrates an interference scenario in a wireless communications system, according to an embodiment of the disclosure.

FIG. 16 illustrates an interference scenario 1600 in a wireless communications system, according to an embodiment of the disclosure. FIG. 16 is similar to FIG. 10, except that UE 302 is further depicted. In FIG. 16, since the LOS signal 1012 and echo signal 1010 are being received on a UL slot, there is a chance for a concurrent interfering UL transmission from UE 302, as shown with respect to UL signals 1605. In this case, the UL signal(s) 1605 may increase interference for the LOS signal 1012 and/or echo signal 1010 at base station 1004, the LOS signal 1012 and/or echo signal 1010 may increase interference for the UL signal(s) 1605 at base station 1004, or both. In some designs, the base station 1004 may attempt to avoid scheduling of the UL signal(s) 1605 to mitigate the potential interference.

Figure 17:
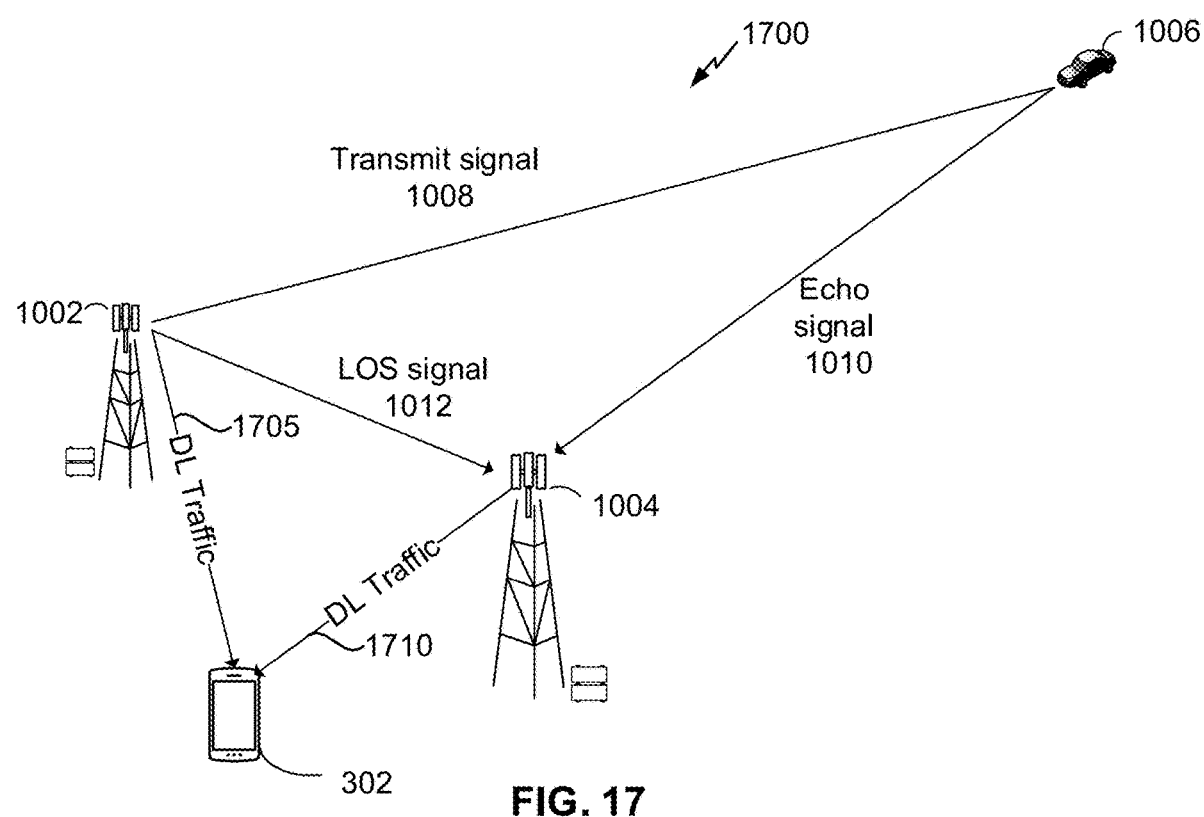
FIG. 17 illustrates an interference scenario in a wireless communications system, according to another embodiment of the disclosure.

FIG. 17 illustrates an interference scenario 1700 in a wireless communications system, according to another embodiment of the disclosure. FIG. 17 is similar to FIG. 10, except that UE 302 is further depicted. In FIG. 17, since the LOS signal 1012 and echo signal 1010 are being transmitted on a DL slot, there is a chance for a concurrent interfering DL transmission(s) from base stations 1002 and/or 1004, as shown with respect to DL signals 1705-1710. In this case, the DL signal(s) 1705-1710 may increase interference for the LOS signal 1012 and/or echo signal 1010 at UE 302, the LOS signal 1012 and/or echo signal 1010 may increase interference for the DL signal(s) 1705-1710 at UE 302, or both. In some designs, the base station 1002 and/or the base station 1004 may attempt to avoid scheduling of the DL signal(s) 1705-1710 to mitigate the potential interference.

DL-PRS resources may be sent by TRPs using a variety of transmission schedules (also called transmission patterns), e.g.:

TABLE 2

PRS Resource Configuration examples

| | 2 symbols | 4 symbols | 6 symbols | 12 symbols |
|---|---|---|---|---|
| Comb-2 | {0, 1} | {0, 1, 0, 1} | {0, 1, 0, 1, 0, 1} | {0, 1, 0, 1, 0, 1, 0, 1, 0, 1, 0, 1} |
| Comb-4 | NA | {0, 2, 1, 3} | NA | {0, 2, 1, 3, 0, 2, 1, 3, 0, 2, 1, 3}} |
| Comb-6 | NA | NA | {0, 3, 1, 4, 2, 5} | {0, 3, 1, 4, 2, 5, 0, 3, 1, 4, 2, 5} |
| Comb-12 | NA | NA | NA | {0, 6, 3, 9, 1, 7, 4, 10, 2, 8, 5, 11} |

FIGS. 18A-18H illustrate DL-PRS resource configurations in accordance with aspects of the disclosure. In the DL-PRS resource configurations of FIGS. 18A-18H, columns represent different symbols, rows represent different subcarriers, and darkened boxes represent sounded resource elements (symbol-subcarrier combinations) for a TRP. Unsounded resource elements could be sounded by one or more other TRPs.

Figure 18A:
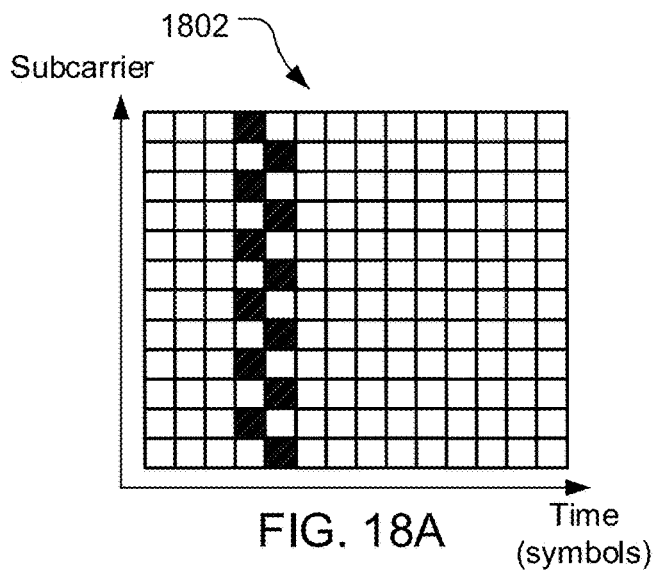
Figure 18B:
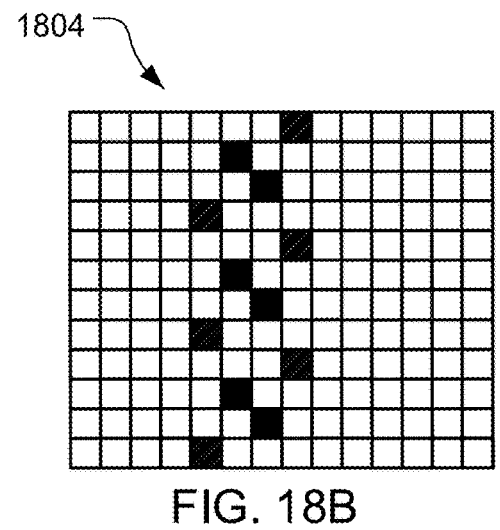
Figure 18C:
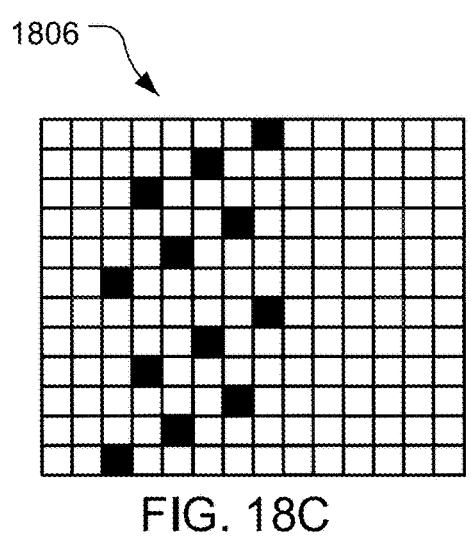
Figure 18D:
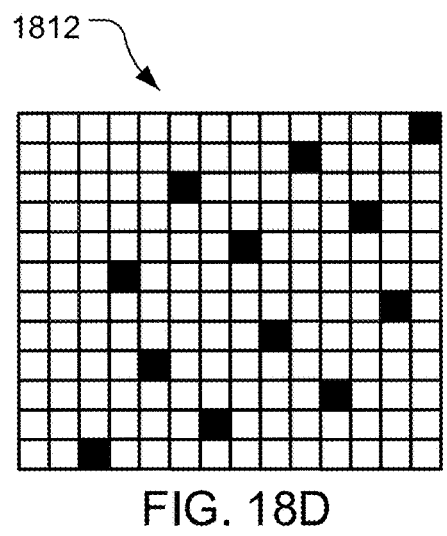
Figure 18E:
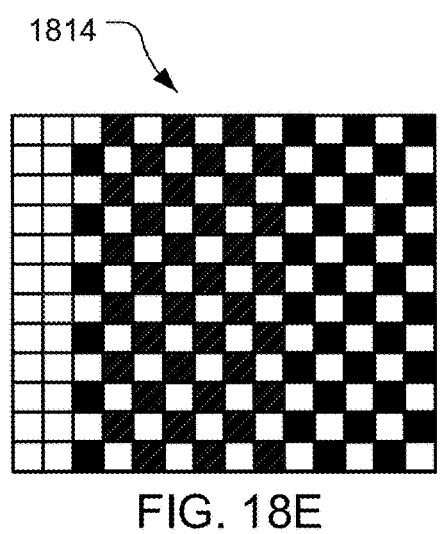
Figure 18F:
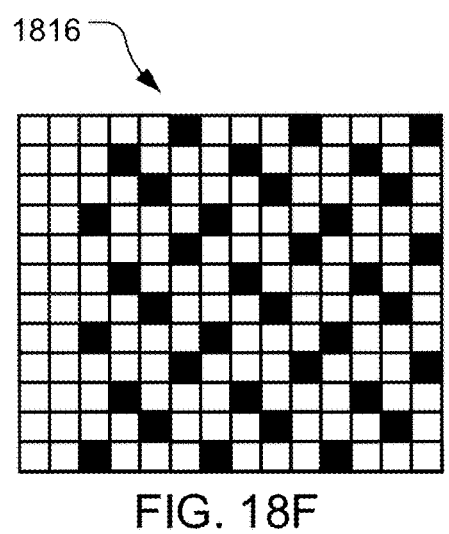

FIG. 18A shows a DL-PRS resource configuration 1802 for a comb-2, 2-symbol resource with a symbol offset of three symbols in a slot containing 14 symbols each with 12 subcarriers. FIG. 18B shows a DL-PRS resource configuration 1804 for a comb-4, 4-symbol resource. FIG. 18C shows a DL-PRS resource configuration 1806 for a comb-6, 6-symbol resource. FIG. 18D shows a DL-PRS resource configuration 1812 for a comb-12, 12-symbol resource. FIG. 18E shows a DL-PRS resource configuration 1814 for a comb-2, 12-symbol resource. FIG. 18F shows a DL-PRS resource configuration 1816 for a comb-4, 12-symbol resource. FIG. 18G shows a DL-PRS resource configuration 1818 for a comb-2, 6-symbol resource. FIG. 18H shows a DL-PRS resource configuration 1820 for a comb-6, 12-symbol resource. Each of the transmission patterns in FIGS. 18A-18H has at least one sounded RE in each of the subcarriers and is thus a fully-staggered transmission pattern. If each DL-PRS resource configuration (or pattern) corresponds to a PRS resource, then each PRS resource is a fully-staggered resource. The DL-PRS resource may be configured in any higher-layer configured DL or FL symbol of a slot. A constant energy per resource element (EPRE) for all REs of a given DL-PRS resource may be used.

PRS may comprise PRS resources, PRS resource sets, or PRS resources of a frequency layer. A DL PRS positioning frequency layer (or simply a frequency layer) is a collection of DL PRS resource sets that have common parameters configured by the parameter DL-PRS-PositioningFrequencyLayer. Each frequency layer has the same DL PRS subcarrier spacing (SCS) for the DL PRS resource sets and the DL PRS resources in the frequency layer. Each frequency layer has the same DL PRS cyclic prefix (CP) type for the DL PRS resource sets and the DL PRS resources in the frequency layer. Also, a DL PRS Point A parameter defines a frequency of a reference resource block, with DL PRS resources belonging to the same DL PRS resource set having the same Point A and all DL PRS resource sets belonging to the same frequency layer having the same Point A. The PRS resource sets of a frequency layer also have the same start PRB (and center frequency) and the same comb-size value.

As used herein, a positioning session may comprise a plurality of PRS instances, with each PRS instance comprising a PRS resource set. The PRS resource set in turn comprises a plurality of PRS resources. For example, in some implementations, a positioning session may span around 20 seconds, whereas each PRS instance may span around 160 ms. DL PRS resources may be repeated to facilitate Rx beam sweeping across different repetitions, combining gains for coverage extension, and/or intra-instance muting. In some designs, PRS configurations can support a number of repetition counts (PRS-ResourceRepetitionFactor) and a number of time gaps (PRS-ResourceTimeGap), as shown in Table 2:

TABLE 2

| Parameter | Functionality |
|---|---|
| PRS-ResourceRepetitionFactor | Number of times each PRS Resource is repeated for a single instance of the PRS Resource Set<br>Values: 1, 2, 4, 6, 8, 16, 32 |
| PRS-ResourceTimeGap | Offset in units of slots between two repeated instances of a DL PRS Resource corresponding to the same PRS Resource ID within a single instance of the DL PRS Resource Set<br>Values: 1, 2, 4, 8, 16, 32 |

Figure 19:
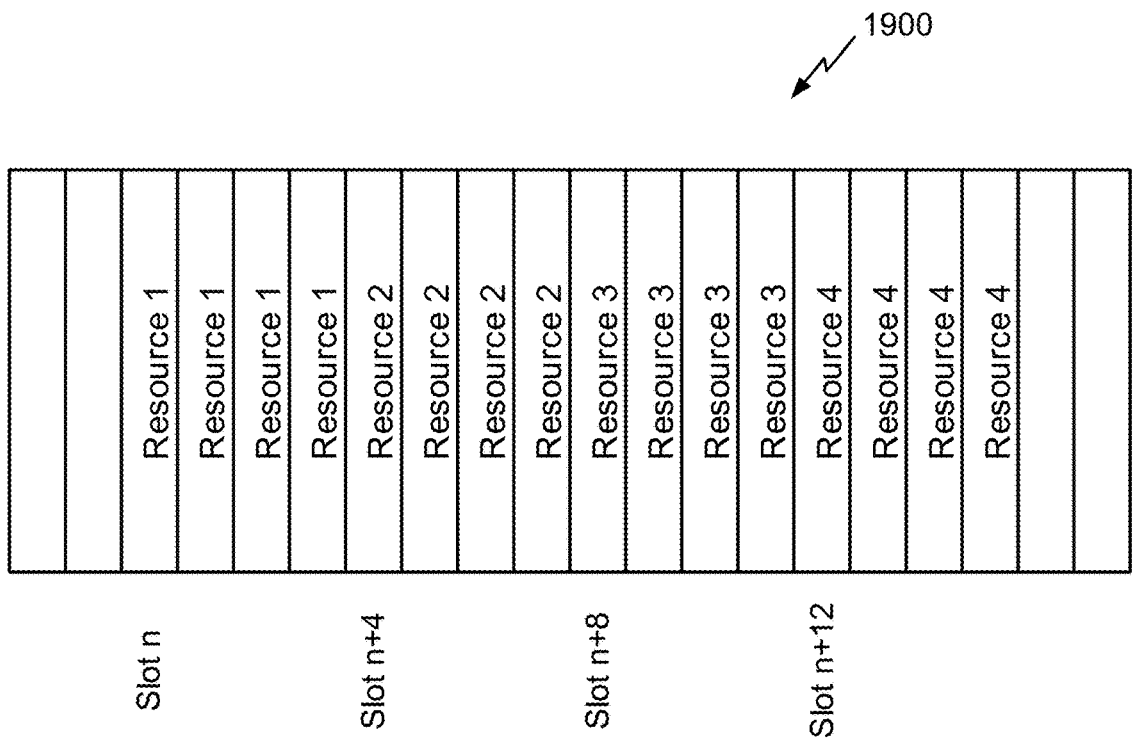
FIG. 19 illustrates a PRS resource distribution in accordance with an embodiment of the disclosure.

FIG. 19 illustrates a PRS resource distribution 1900 in accordance with an embodiment of the disclosure. The PRS resource distribution 1900 reflects a DL-PRS Resource set with 4 resources, a PRS-ResourceRepetitionFactor of 4, and a PRS-ResourceTimeGap of 1 slot.

Figure 20:
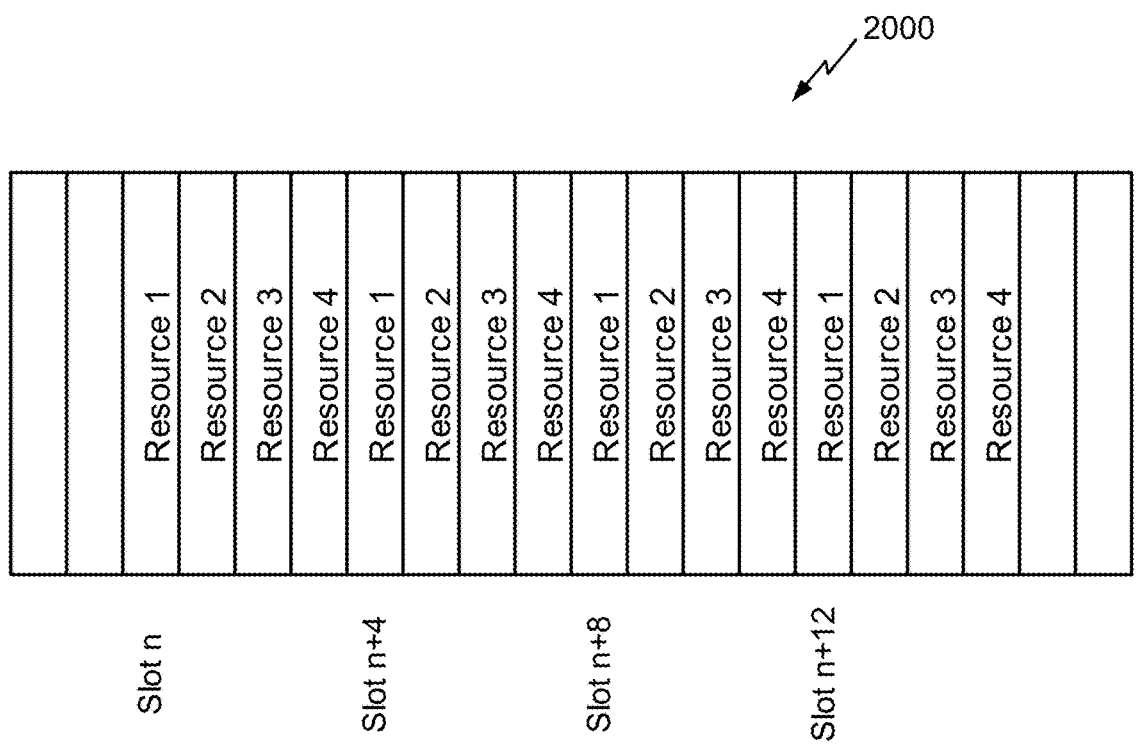
FIG. 20 illustrates a PRS resource distribution in accordance with another embodiment of the disclosure.

FIG. 20 illustrates a PRS resource distribution 2000 in accordance with another embodiment of the disclosure. The PRS resource distribution 2000 reflects a DL-PRS Resource set with 4 resources, a PRS-ResourceRepetitionFactor of 4, and a PRS-ResourceTimeGap of 4 slots.

The time interval between the reception of LOS signal transmitted by Tx and the reception of target echo could be used to measure the range sum $R_{sum}$. Hence, the small-scale synchronization error between Tx/Rx will not introduce estimation error. In classic radar systems, the same/common transmitted radar signal is propagated through the channels. Then Rx estimates the ToA difference between LOS path and echo path.

In some cases, using the same radar reference signal to estimate ToA in both LOS and target echo path is not optimal for various reasons. Firstly, a single wide-angle beam may be applied for the radar Tx waveform, which reduces the coverage of systems (e.g., a more focused beam may provide more coverage, but may not be capable of traveling along both the LOS path and echo path). Secondly, digital beamforming may enable two concurrent beams, i.e., one for LOS direction, one for transmitter-target direction. However, this increases a number of Tx antennas at the gNBs for concurrent transmission along the two paths (two beams), such that the antenna cost is doubled. Thirdly, for mm-wave systems using analog beamforming, it is also possible to maintain two concurrent beams. However, this requires at least two antenna panels for each sector, i.e., one for LOS beam, one for transmitter-target direction, such that the antenna panel cost is doubled.

Irrespective of which symbols are used for the transmission/reception of the target radar waveform, a reference radar signal may be transmitted so that the gNB Rx would be able to determine the "baseline", denoted in FIG. 9 as L. The gNBs are static, and there is no need to transmit long signals to learn Doppler information, as in the case where a moving target is being tracked by the target radar wave form. The radar controller is aware of the locations of the gNBs, so a need may arise for the transmission/reception of a signal to learn the baseline to determine Tx/Rx/network-sync ambiguities. In some designs, the "baseline" may need to be estimated (or calibrated) at some interval that may depend of the level of the time-domain ambiguities and how often such ambiguities are changing (e.g., time-domain drift).

One or more aspects of the disclosure are directed to implementation of power control parameter(s) associated with radar signal(s) from a Tx gNB (second base station) to a Rx gNB (first base station), at least one UL transmission with a potential for interference with the at least one radar signal (e.g., as shown in FIG. 16), or a combination thereof, or a combination thereof. In some designs, based on the power control parameter(s), the Rx gNB may implement at least one action to mitigate impact by the at least one radar signal to the at least one UL transmission, or by the at least one UL transmission to the at least one radar signal, or a combination thereof. Such aspects may provide various technical advantages, such as mitigating interference to the radar signal(s) which in turn improves target tracking accuracy and coverage, mitigating interference to the UL transmission(s) which improves connection quality and user experience, and so on.

Figure 21:
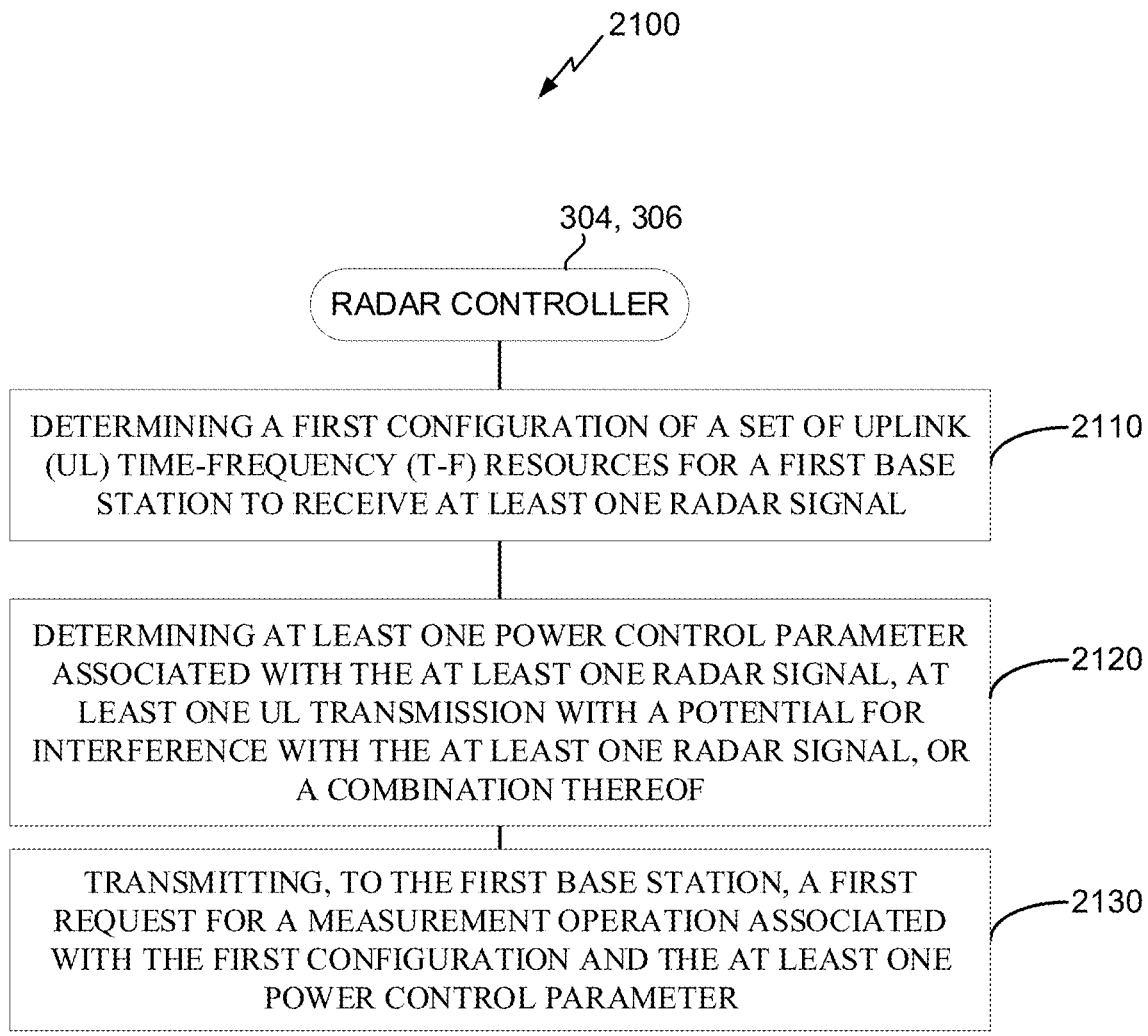
FIG. 21 illustrates an exemplary process of communication, according to aspects of the disclosure.

FIG. 21 illustrates an exemplary process 2100 of communication, according to aspects of the disclosure. In an aspect, the process 2100 may be performed by a radar controller, which as noted above may be integrated with a RAN component such as BS 304, or a core network component or external server such as network entity 306. In some designs, the radar controller may be integrated with the first or second base station as described above, in which case any exchange of data between the radar controller and the respective base station would correspond to an internal transfer of data rather than signal(s) being communicated across a network.

At 2110, the radar controller (e.g., processing system 384 or 394, radar component 388 or 389, etc.) determines a first configuration of a set of uplink (UL) time-frequency (T-F) resources for a first base station (e.g., Rx gNB) to receive at least one radar signal. In some designs, the at least one radar signal may be transmitted from a second base station (e.g., Tx gNB).

At 2120, the radar controller (e.g., processing system 384 or 394, radar component 388 or 389, etc.) determines at least one power control parameter associated with the at least one radar signal (e.g., a reference radar signal, one or more target radar signals, etc.), at least one UL transmission with a potential for interference with the at least one radar signal, or a combination thereof.

At 2130, the radar controller (e.g., data bus 382, network interface(s) 380 or 390, etc.) transmits, to the first base station, a first request for a measurement operation associated with the first configuration and the at least one power control parameter.

Figure 22:
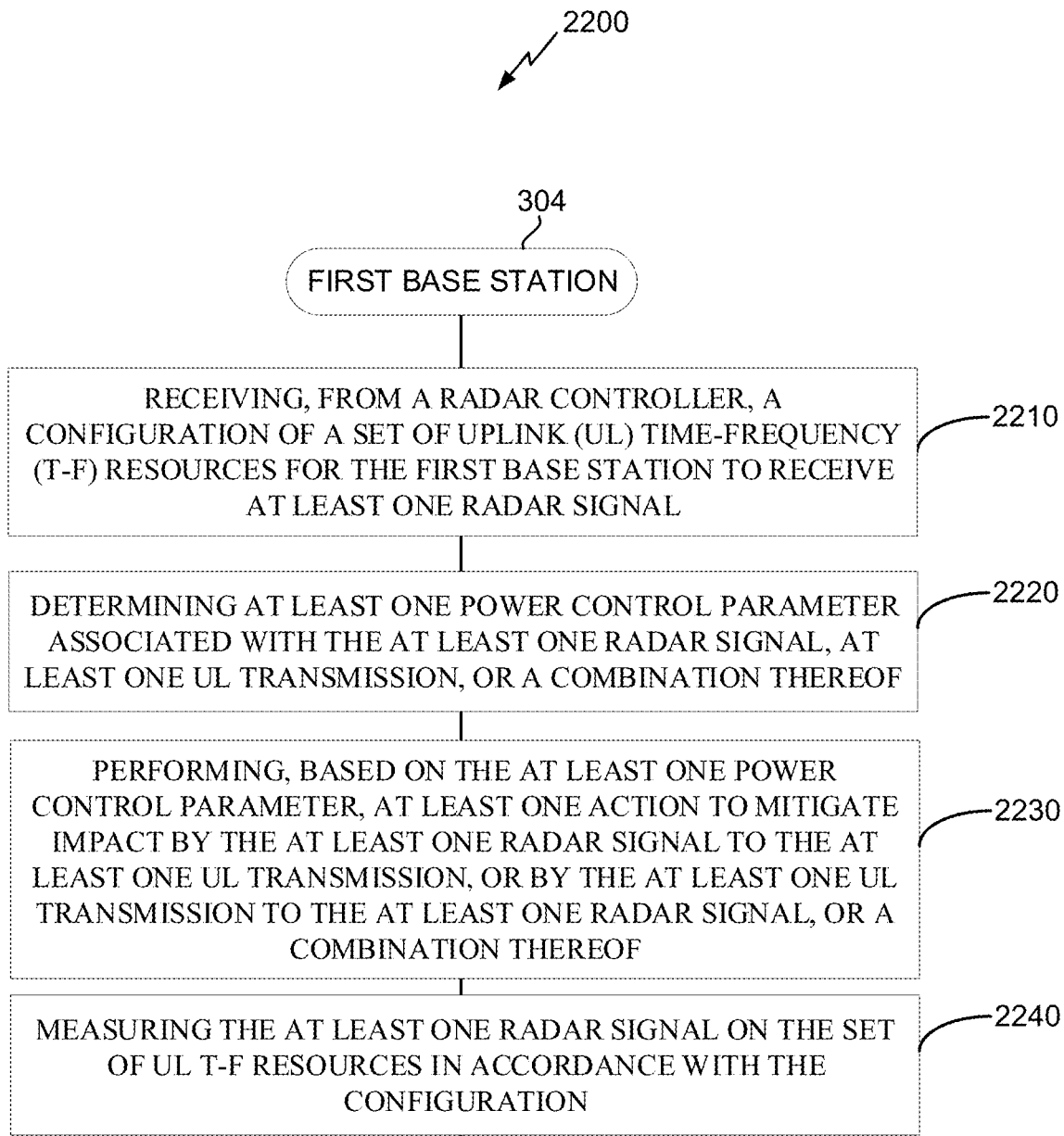
FIG. 22 illustrates an exemplary process of wireless communication, according to aspects of the disclosure.

FIG. 22 illustrates an exemplary process 2200 of communication, according to aspects of the disclosure. In an aspect, the process 2200 may be performed by a first base station, such as BS 304. For example, the first base station described with respect to FIG. 22 may correspond to the first base station described above with respect to FIG. 21 (e.g., the Rx gNB which receives the radar signal(s) from a Tx gNB). In some designs, the radar controller may be integrated with the first base station as described above, in which case any exchange of data between the radar controller and the first base station would correspond to an internal transfer of data rather than signal(s) being communicated across a network.

At 2210, the first base station (e.g., network interface(s) 380, data bus 382, etc.) receives, from a radar controller, a configuration of a set of uplink (UL) time-frequency (T-F) resources for the first base station (e.g., Rx gNB) to receive at least one radar signal. In some designs, the at least one radar signal may be transmitted from a second base station (e.g., Tx gNB). In some designs, the configuration received at 2210 corresponds to the first configuration described with respect to FIG. 21. For this reason, reference to the configuration received at 2210 may be used interchangeably with reference to the first configuration.

At 2220, the first base station (e.g., network interface(s) 380, data bus 382, etc.) determines at least one power control parameter associated with the at least one radar signal, at least one UL transmission, or a combination thereof. In some designs, the determination at 2220 may be based upon receipt of the power control parameter(s) from the radar controller as described above with respect to 2130 of FIG. 21. In other designs, the power control parameter(s) may be determined in other ways (e.g., pre-defined in the relevant standard, configured by a network operator, etc.).

At 2230, the first base station (e.g., transmitter 354 or 364, radar component 388, processing system 384, etc.) performs, based on the at least one power control parameter, at least one action to mitigate impact by the at least one radar signal to the at least one UL transmission, or by the at least one UL transmission to the at least one radar signal, or a combination thereof. Various examples of the action(s) that may be performed at 2230 are described below in more detail.

At 2240, the first base station (e.g., receiver 352 or 362, radar component 388, processing system 384, etc.) measures the at least one radar signal on the set of UL T-F resources in accordance with the configuration.

Referring to FIGS. 21-22, in some designs, the radar controller may also determine a second configuration of a set of downlink (DL) T-F resources for the second base station to transmit the at least one radar signal to the first base station, and may transmit, to the second base station, a second request for a transmission operation associated with the second configuration to the second base station. In other words, the radar controller may coordinate the T-F resources on both ends of the radar signal communication. In some designs, similar to the first configuration, the second configuration may be configured on-demand, aperiodically, or semi-persistently.

Referring to FIGS. 21-22, in some designs, the at least one power control parameter may comprise:
- a maximum interference on the set of UL T-F resources for the at least one UL transmission, the at least one radar signal, or a combination thereof, or
- a power level on the set of UL T-F resources for the at least one UL transmission, the at least one radar signal, or a combination thereof, or
- a relative power level on the set of UL T-F resources between the at least one radar signal and the at least one UL transmission, or
- an instruction to mute some or all UL transmissions on the set of UL T-F resources in a time-domain or a T-F domain, or
- a combination thereof.

Referring to FIGS. 21-22, in some designs, the first configuration and/or the at least one power control parameter may be configured on-demand, aperiodically, or semi-persistently.

Referring to FIGS. 21-22, in some designs, the first base station may send, to the radar controller, an interference measurement report (e.g., associated with the at least one radar signal on the set of UL T-F resources). The first base station may then determine, based on (or in response to) the interference measurement report, whether to update the first configuration, the at least one power control parameter, or a combination thereof. In some designs, the interference measurement report comprises:
- a signal-to-interference-plus-noise (SINR), Received Signal Strength Indicator (RSSI), or Reference Signal Receive Power (RSRP), of the at least one UL transmission on the set of UL T-F resources (e.g., long-term level of interference), or
- a differential in SINR, RSSI, or RSRP, between a first subset of the set of UL T-F resources that comprise the at least one radar signal and a second subset of the set of UL T-F resources that do not comprise the at least one radar signal, or
- a power headroom report that indicates available transmission power increase (e.g., from an increase or decrease to transmission power may be decided) to a transmission power level of the at least one radar signal, or
- a recommendation of one or more different resources for the at least one radar signal, or
- a combination thereof.

Referring to FIGS. 21-22, in some designs where the interference measurement report comprises the recommendation of the one or more different resources for the at least one radar signal, the one or more different resources comprise a time-domain resource, a frequency-domain resource, a beam resource, or a combination thereof.

Referring to FIGS. 21-22, in some designs, the interference measurement report may be associated with the at least one radar signal or the set of UL T-F resources or a combination thereof and may be specific to a set of symbols, a set of frequencies, a set of beam directions, or a combination thereof. In some designs, the association between the interference measurement report and the at least one radar signal or the set of UL T-F resources or a combination thereof may be implicit or explicit. For example, if only one radar signal is transmitted on only one resource, then the radar controller will only expect one measurement report from the first base station, in which case an explicit association can be omitted and an implicit association is obtained from the transmission of any interference measurement report. In some designs, the interference measurement report may be transmitted by the first base station to the radar controller in response to at least one triggering event. For example, the at least one triggering event may include initial receipt by the first base station of the first request (e.g., a new request for reception of a radar signal may trigger the interference measurement report for interference calibration), or a measured signal-to-interference-plus-noise (SINR) on the set of UL T-F resources dropping below an SINR threshold (e.g., a configurable threshold which can be adjusted by the radar controller as needed), or receipt of an updated configuration for an updated set of UL T-F resources (e.g., a new radar signal configuration may trigger the interference measurement report for interference calibration), or a combination thereof.

Referring to FIGS. 21-22, in some designs, the at least one power control parameter is configured as an update to at least one other power control power determined at the first base station independently from the radar controller. For example, the power control parameter(s) from the radar controller may be sent so as to override default (e.g., pre-defined or network-configured) power control parameter(s).

Referring to FIGS. 21-22, in some designs, as noted above, the first base station may be configured with the power control parameter(s) by the radar controller, or independently from the radar controller.

Referring to FIGS. 21-22, in some designs, the at least one action performed at 2230 may comprise muting the at least one UL transmission or modifying (e.g., lowering) a transmission power level of the at least one UL transmission, or transmitting a message to the radar controller to request a modification to a transmission power level of the at least one radar signal, or a combination thereof.

Figure 23:
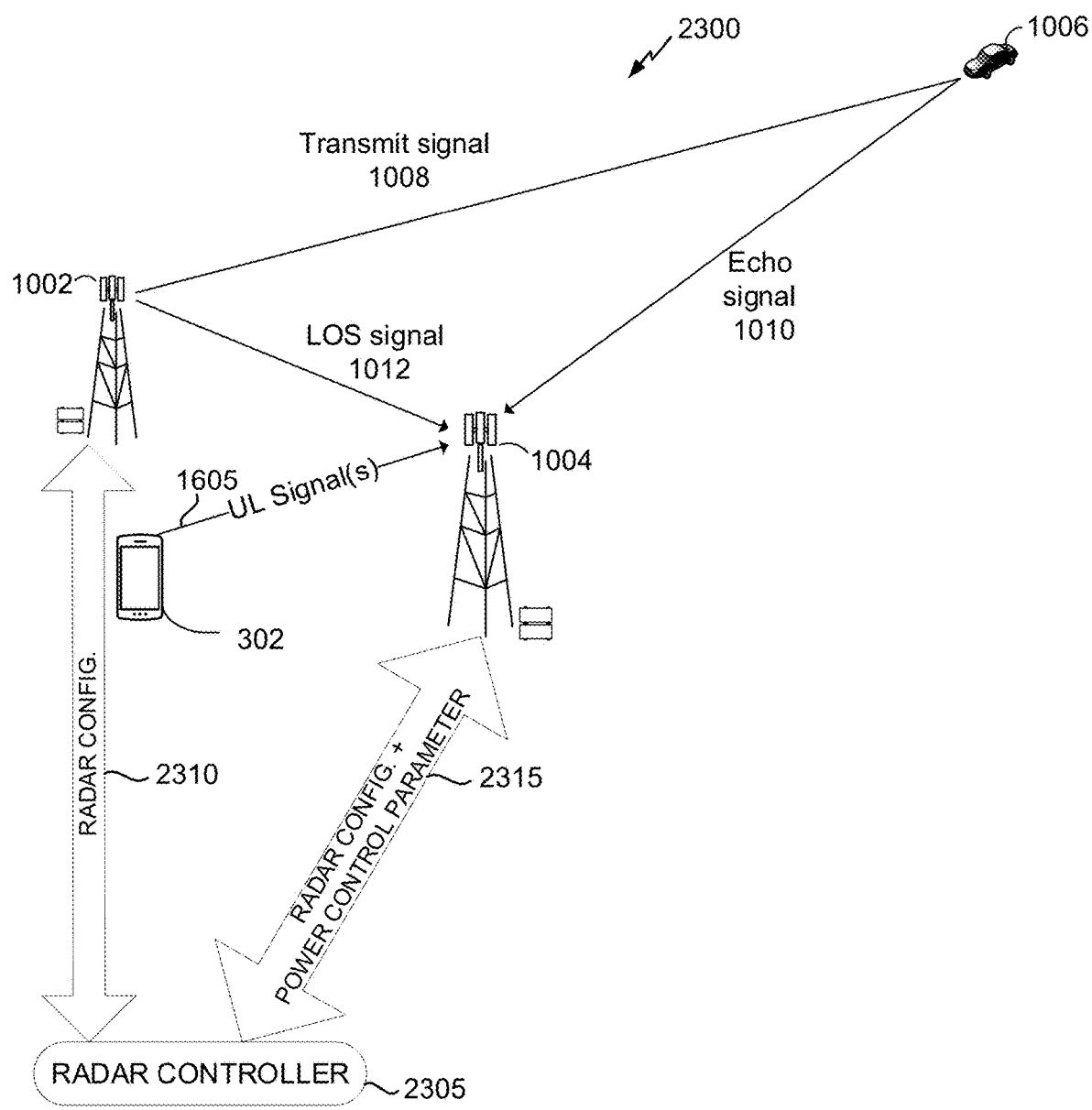
FIG. 23 illustrates an interference scenario in a wireless communications system, according to an example implementation of the processes of FIGS. 21-22, respectively

FIG. 23 illustrates an interference scenario 2300 in a wireless communications system, according to an example implementation of the processes 2100-2200 of FIGS. 21-22, respectively. The interference scenario 2300 is a modified version of the interference scenario 1600 of FIG. 16, with a radar controller 2305 being further depicted. The radar controller 2305 transmits a configuration 2310 for DL T-F resources for transmission of radar signal(s) to TX BS 1002, and a configuration 2315 for UL T-F resources for reception of the radar signal(s) to RX BS 1004. In FIG. 23, the configuration 2315 is further sent in conjunction with the power control parameter(s) described above with respect to FIGS. 21-22. However, it will be appreciated that the power control parameter(s) may alternatively be determined by RX BS 1004 independent of the radar controller 2305 as described above.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a radar controller, comprising: determining a first configuration of a set of uplink (UL) time-frequency (T-F) resources for a first base station to receive at least one radar signal; determining at least one power control parameter associated with the at least one radar signal, at least one UL transmission with a potential for interference with the at least one radar signal, or a combination thereof; and transmitting, to the first base station, a first request for a measurement operation associated with the first configuration and the at least one power control parameter.

Clause 2. The method of clause 1, further comprising: determining a second configuration of a set of downlink (DL) T-F resources for a second base station to transmit the at least one radar signal; and transmitting, to the second base station, a second request for a transmission operation associated with the second configuration to the second base station.

Clause 3. The method of clause 2, wherein the second configuration is configured on-demand, aperiodically, or semi-persistently.

Clause 4. The method of any of clauses 1 to 3, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 5. The method of any of clauses 1 to 4, wherein the first configuration is configured on-demand, aperiodically, or semi-persistently.

Clause 6. The method of any of clauses 1 to 5, further comprising: receiving, from the first base station, an interference measurement report; and determining, based on the interference measurement report, whether to update the first configuration, the at least one power control parameter, or a combination thereof.

Clause 7. The method of clause 6, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 8. The method of clause 7, wherein the one or more different resources comprise a time-domain resource, a frequency-domain resource, a beam resource, or a combination thereof.

Clause 9. The method of any of clauses 6 to 8, wherein the interference measurement report is associated with the at least one radar signal or the set of UL T-F resources or a combination thereof and is specific to a set of symbols, a set of frequencies, a set of beam directions, or a combination thereof.

Clause 10. The method of any of clauses 6 to 9, wherein the interference measurement report is received in response to at least one triggering event.

Clause 11. The method of clause 10, wherein the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

Clause 12. The method of any of clauses 1 to 11, wherein the radar controller corresponds to an access network component, a core network component, a location management function (LMF) component, a component that is external to a serving network associated with the first base station, or a combination thereof.

Clause 13. The method of any of clauses 1 to 12, wherein the at least one power control parameter is configured as an update to at least one other power control power determined at the first base station independently from the radar controller.

Clause 14. A method of operating a first base station, comprising: receiving, from a radar controller, a configuration of a set of uplink (UL) time-frequency (T-F) resources for the first base station to receive at least one radar signal; determining at least one power control parameter associated with the at least one radar signal, at least one UL transmission, or a combination thereof performing, based on the at least one power control parameter, at least one action to mitigate impact by the at least one radar signal to the at least one UL transmission, or by the at least one UL transmission to the at least one radar signal, or a combination thereof and measuring the at least one radar signal on the set of UL T-F resources in accordance with the configuration.

Clause 15. The method of clause 14, wherein the determining comprises receiving the at least one power control parameter from the radar controller, or wherein the determining determines the at least one power control parameter independently from the radar controller.

Clause 16. The method of any of clauses 14 to 15, wherein the at least one action comprises: muting the at least one UL transmission or modifying a transmission power level of the at least one UL transmission, or transmitting a message to the radar controller to request a modification to a transmission power level of the at least one radar signal, or a combination thereof.

Clause 17. The method of any of clauses 14 to 16, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 18. The method of any of clauses 14 to 17, wherein the configuration is configured on-demand, aperiodically, or semi-persistently.

Clause 19. The method of any of clauses 14 to 18, further comprising:
transmitting, to the radar controller, an interference measurement report.

Clause 20. The method of clause 19, further comprising: receiving, from the radar controller in response to the interference measurement report, an update to the configuration, the at least one power control parameter, or a combination thereof.

Clause 21. The method of any of clauses 19 to 20, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 22. The method of clause 21, wherein the one or more different resources comprise a time-domain resource, a frequency-domain resource, a beam resource, or a combination thereof.

Clause 23. The method of any of clauses 20 to 22, wherein the interference measurement report is associated with the at least one radar signal or the set of UL T-F resources or a combination thereof and is specific to a set of symbols, a set of frequencies, a set of beam directions, or a combination thereof.

Clause 24. The method of any of clauses 20 to 23, wherein the interference measurement report is transmitted in response to at least one triggering event.

Clause 25. The method of clause 24, wherein the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

Clause 26. The method of clause 25, wherein the radar controller corresponds to an access network component, a core network component, a location management function (LMF) component, a component that is external to a serving network associated with the first base station, or a combination thereof.

Clause 27. The method of any of clauses 14 to 26, wherein the at least one radar signal is received from a second based station.

Clause 28. A radar controller, comprising: a memory; at least one transceiver; and at least one processor communicatively coupled to the memory and the at least one transceiver, the at least one processor configured to: determine a first configuration of a set of uplink (UL) time-frequency (T-F) resources for a first base station to receive at least one radar signal; determine at least one power control parameter associated with the at least one radar signal, at least one UL transmission with a potential for interference with the at least one radar signal, or a combination thereof and transmit, via the at least one transceiver, to the first base station, a first request for a measurement operation associated with the first configuration and the at least one power control parameter.

Clause 29. The radar controller of clause 28, wherein the at least one processor is further configured to: determine a second configuration of a set of downlink (DL) T-F resources for a second base station to transmit the at least one radar signal; and transmit, via the at least one transceiver, to the second base station, a second request for a transmission operation associated with the second configuration to the second base station.

Clause 30. The radar controller of clause 29, wherein the second configuration is configured on-demand, aperiodically, or semi-persistently.

Clause 31. The radar controller of any of clauses 28 to 30, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 32. The radar controller of any of clauses 28 to 31, wherein the first configuration is configured on-demand, aperiodically, or semi-persistently.

Clause 33. The radar controller of any of clauses 28 to 32, wherein the at least one processor is further configured to: receive, via the at least one transceiver, from the first base station, an interference measurement report; and determine, based on the interference measurement report, whether to update the first configuration, the at least one power control parameter, or a combination thereof.

Clause 34. The radar controller of clause 33, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 35. The radar controller of clause 34, wherein the one or more different resources comprise a time-domain resource, a frequency-domain resource, a beam resource, or a combination thereof.

Clause 36. The radar controller of any of clauses 33 to 35, wherein the interference measurement report is associated with the at least one radar signal or the set of UL T-F resources or a combination thereof and is specific to a set of symbols, a set of frequencies, a set of beam directions, or a combination thereof.

Clause 37. The radar controller of any of clauses 33 to 36, wherein the interference measurement report is received in response to at least one triggering event.

Clause 38. The radar controller of clause 37, wherein the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

Clause 39. The radar controller of any of clauses 28 to 38, wherein the radar controller corresponds to an access network component, a core network component, a location management function (LMF) component, a component that is external to a serving network associated with the first base station, or a combination thereof.

Clause 40. The radar controller of any of clauses 28 to 39, wherein the at least one power control parameter is configured as an update to at least one other power control power determined at the first base station independently from the radar controller.

Clause 41. A first base station, comprising: a memory; at least one transceiver; and at least one processor communicatively coupled to the memory and the at least one transceiver, the at least one processor configured to: receive, via the at least one transceiver, from a radar controller, a configuration of a set of uplink (UL) time-frequency (T-F) resources for the first base station to receive at least one radar signal; determine at least one power control parameter associated with the at least one radar signal, at least one UL transmission, or a combination thereof; perform, based on the at least one power control parameter, at least one action to mitigate impact by the at least one radar signal to the at least one UL transmission, or by the at least one UL transmission to the at least one radar signal, or a combination thereof; and measure the at least one radar signal on the set of UL T-F resources in accordance with the configuration.

Clause 42. The first base station of clause 41, wherein the determining comprises receiving the at least one power control parameter from the radar controller, or wherein the determining determines the at least one power control parameter independently from the radar controller.

Clause 43. The first base station of any of clauses 41 to 42, wherein the at least one action comprises: mute the at least one UL transmission or modifying a transmission power level of the at least one UL transmission, or transmit, via the at least one transceiver, a message to the radar controller to request a modification to a transmission power level of the at least one radar signal, or a combination thereof.

Clause 44. The first base station of any of clauses 41 to 43, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 45. The first base station of any of clauses 41 to 44, wherein the configuration is configured on-demand, aperiodically, or semi-persistently.

Clause 46. The first base station of any of clauses 41 to 45, wherein the at least one processor is further configured to: transmit, via the at least one transceiver, to the radar controller, an interference measurement report.

Clause 47. The first base station of clause 46, wherein the at least one processor is further configured to: receive, via the at least one transceiver, from the radar controller in response to the interference measurement report, an update to the configuration, the at least one power control parameter, or a combination thereof.

Clause 48. The first base station of any of clauses 46 to 47, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 49. The first base station of clause 48, wherein the one or more different resources comprise a time-domain resource, a frequency-domain resource, a beam resource, or a combination thereof.

Clause 50. The first base station of any of clauses 47 to 49, wherein the interference measurement report is associated with the at least one radar signal or the set of UL T-F resources or a combination thereof and is specific to a set of symbols, a set of frequencies, a set of beam directions, or a combination thereof.

Clause 51. The first base station of any of clauses 47 to 50, wherein the interference measurement report is transmitted in response to at least one triggering event.

Clause 52. The first base station of clause 51, wherein the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

Clause 53. The first base station of clause 52, wherein the radar controller corresponds to an access network component, a core network component, a location management function (LMF) component, a component that is external to a serving network associated with the first base station, or a combination thereof.

Clause 54. The first base station of any of clauses 41 to 53, wherein the at least one radar signal is received from a second based station.

Clause 55. A radar controller, comprising: means for determining a first configuration of a set of uplink (UL) time-frequency (T-F) resources for a first base station to receive at least one radar signal; means for determining at least one power control parameter associated with the at least one radar signal, at least one UL transmission with a potential for interference with the at least one radar signal, or a combination thereof; and means for transmitting, to the first base station, a first request for a measurement operation associated with the first configuration and the at least one power control parameter.

Clause 56. The radar controller of clause 55, further comprising: means for determining a second configuration of a set of downlink (DL) T-F resources for a second base station to transmit the at least one radar signal; and means for transmitting, to the second base station, a second request for a transmission operation associated with the second configuration to the second base station.

Clause 57. The radar controller of clause 56, wherein the second configuration is configured on-demand, aperiodically, or semi-persistently.

Clause 58. The radar controller of any of clauses 55 to 57, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 59. The radar controller of any of clauses 55 to 58, wherein the first configuration is configured on-demand, aperiodically, or semi-persistently.

Clause 60. The radar controller of any of clauses 55 to 59, further comprising: means for receiving, from the first base station, an interference measurement report; and means for determining, based on the interference measurement report, whether to update the first configuration, the at least one power control parameter, or a combination thereof.

Clause 61. The radar controller of clause 60, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 62. The radar controller of clause 61, wherein the one or more different resources comprise a time-domain resource, a frequency-domain resource, a beam resource, or a combination thereof.

Clause 63. The radar controller of any of clauses 60 to 62, wherein the interference measurement report is associated with the at least one radar signal or the set of UL T-F resources or a combination thereof and is specific to a set of symbols, a set of frequencies, a set of beam directions, or a combination thereof.

Clause 64. The radar controller of any of clauses 60 to 63, wherein the interference measurement report is received in response to at least one triggering event.

Clause 65. The radar controller of clause 64, wherein the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

Clause 66. The radar controller of any of clauses 55 to 65, wherein the radar controller corresponds to an access network component, a core network component, a location management function (LMF) component, a component that is external to a serving network associated with the first base station, or a combination thereof.

Clause 67. The radar controller of any of clauses 55 to 66, wherein the at least one power control parameter is configured as an update to at least one other power control power determined at the first base station independently from the radar controller.

Clause 68. A first base station, comprising: means for receiving, from a radar controller, a configuration of a set of uplink (UL) time-frequency (T-F) resources for the first base station to receive at least one radar signal; means for determining at least one power control parameter associated with the at least one radar signal, at least one UL transmission, or a combination thereof; means for performing, based on the at least one power control parameter, at least one action to mitigate impact by the at least one radar signal to the at least one UL transmission, or by the at least one UL transmission to the at least one radar signal, or a combination thereof; and means for measuring the at least one radar signal on the set of UL T-F resources in accordance with the configuration.

Clause 69. The first base station of clause 68, wherein the determining comprises receiving the at least one power control parameter from the radar controller, or wherein the determining determines the at least one power control parameter independently from the radar controller.

Clause 70. The first base station of any of clauses 68 to 69, wherein the at least one action comprises: means for muting the at least one UL transmission or modifying a transmission power level of the at least one UL transmission, or means for transmitting a message to the radar controller to request a modification to a transmission power level of the at least one radar signal, or a combination thereof.

Clause 71. The first base station of any of clauses 68 to 70, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 72. The first base station of any of clauses 68 to 71, wherein the configuration is configured on-demand, aperiodically, or semi-persistently.

Clause 73. The first base station of any of clauses 68 to 72, further comprising: means for transmitting, to the radar controller, an interference measurement report.

Clause 74. The first base station of clause 73, further comprising: means for receiving, from the radar controller in response to the interference measurement report, an update to the configuration, the at least one power control parameter, or a combination thereof.

Clause 75. The first base station of any of clauses 73 to 74, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 76. The first base station of clause 75, wherein the one or more different resources comprise a time-domain resource, a frequency-domain resource, a beam resource, or a combination thereof.

Clause 77. The first base station of any of clauses 74 to 76, wherein the interference measurement report is associated with the at least one radar signal or the set of UL T-F resources or a combination thereof and is specific to a set of symbols, a set of frequencies, a set of beam directions, or a combination thereof.

Clause 78. The first base station of any of clauses 74 to 77, wherein the interference measurement report is transmitted in response to at least one triggering event.

Clause 79. The first base station of clause 78, wherein the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

Clause 80. The first base station of clause 79, wherein the radar controller corresponds to an access network component, a core network component, a location management function (LMF) component, a component that is external to a serving network associated with the first base station, or a combination thereof.

Clause 81. The first base station of any of clauses 68 to 80, wherein the at least one radar signal is received from a second based station.

Clause 82. A non-transitory computer-readable medium storing computer-executable instructions that, when executed by a radar controller, cause the radar controller to: determine a first configuration of a set of uplink (UL) time-frequency (T-F) resources for a first base station to receive at least one radar signal; determine at least one power control parameter associated with the at least one radar signal, at least one UL transmission with a potential for interference with the at least one radar signal, or a combination thereof and transmit, to the first base station, a first request for a measurement operation associated with the first configuration and the at least one power control parameter.

Clause 83. The non-transitory computer-readable medium of clause 82, further comprising instructions that, when executed by radar controller, further cause the radar controller to: determine a second configuration of a set of downlink (DL) T-F resources for a second base station to transmit the at least one radar signal; and transmit, to the second base station, a second request for a transmission operation associated with the second configuration to the second base station.

Clause 84. The non-transitory computer-readable medium of clause 83, wherein the second configuration is configured on-demand, aperiodically, or semi-persistently.

Clause 85. The non-transitory computer-readable medium of any of clauses 82 to 84, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 86. The non-transitory computer-readable medium of any of clauses 82 to 85, wherein the first configuration is configured on-demand, aperiodically, or semi-persistently.

Clause 87. The non-transitory computer-readable medium of any of clauses 82 to 86, further comprising instructions that, when executed by radar controller, further cause the radar controller to: receive, from the first base station, an interference measurement report; and determine, based on the interference measurement report, whether to update the first configuration, the at least one power control parameter, or a combination thereof.

Clause 88. The non-transitory computer-readable medium of clause 87, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 89. The non-transitory computer-readable medium of clause 88, wherein the one or more different resources comprise a time-domain resource, a frequency-domain resource, a beam resource, or a combination thereof.

Clause 90. The non-transitory computer-readable medium of any of clauses 87 to 89, wherein the interference measurement report is associated with the at least one radar signal or the set of UL T-F resources or a combination thereof and is specific to a set of symbols, a set of frequencies, a set of beam directions, or a combination thereof.

Clause 91. The non-transitory computer-readable medium of any of clauses 87 to 90, wherein the interference measurement report is received in response to at least one triggering event.

Clause 92. The non-transitory computer-readable medium of clause 91, wherein the at least one triggering event comprises: initial receipt by the first base station of the first request, or a measured signal-to-interference-plus-noise (SINR) on the set of UL T-F resources dropping below an SINR threshold, or receipt of an updated configuration for an updated set of UL T-F resources, or a combination thereof.

Clause 93. The non-transitory computer-readable medium of any of clauses 82 to 92, wherein the radar controller corresponds to an access network component, a core network component, a location management function (LMF) component, a component that is external to a serving network associated with the first base station, or a combination thereof.

Clause 94. The non-transitory computer-readable medium of any of clauses 82 to 93, wherein the at least one power control parameter is configured as an update to at least one other power control power determined at the first base station independently from the radar controller.

Clause 95. A non-transitory computer-readable medium storing computer-executable instructions that, when executed by a first base station, cause the first base station to: receive, from a radar controller, a configuration of a set of uplink (UL) time-frequency (T-F) resources for the first base station to receive at least one radar signal; determine at least one power control parameter associated with the at least one radar signal, at least one UL transmission, or a combination thereof; perform, based on the at least one power control parameter, at least one action to mitigate impact by the at least one radar signal to the at least one UL transmission, or by the at least one UL transmission to the at least one radar signal, or a combination thereof; and measure the at least one radar signal on the set of UL T-F resources in accordance with the configuration.

Clause 96. The non-transitory computer-readable medium of clause 95, wherein the determining comprises receiving the at least one power control parameter from the radar controller, or wherein the determining determines the at least one power control parameter independently from the radar controller.

Clause 97. The non-transitory computer-readable medium of any of clauses 95 to 96, wherein the at least one action comprises: mute the at least one UL transmission or modifying a transmission power level of the at least one UL transmission, or transmit a message to the radar controller to request a modification to a transmission power level of the at least one radar signal, or a combination thereof.

Clause 98. The non-transitory computer-readable medium of any of clauses 95 to 97, wherein the at least one power control parameter comprises: a maximum interference on the set of UL T-F resources for the at least one UL transmission, the at least one radar signal, or a combination thereof, or a power level on the set of UL T-F resources for the at least one UL transmission, the at least one radar signal, or a combination thereof, or a relative power level on the set of UL T-F resources between the at least one radar signal and the at least one UL transmission, or an instruction to mute some or all UL transmissions on the set of UL T-F resources in a time-domain or a T-F domain, or a combination thereof.

Clause 99. The non-transitory computer-readable medium of any of clauses 95 to 98, wherein the configuration is configured on-demand, aperiodically, or semi-persistently.

Clause 100. The non-transitory computer-readable medium of any of clauses 95 to 99, further comprising instructions that, when executed by first base station, further cause the first base station to: transmit, to the radar controller, an interference measurement report.

Clause 101. The non-transitory computer-readable medium of clause 100, further comprising instructions that, when executed by first base station, further cause the first base station to: receive, from the radar controller in response to the interference measurement report, an update to the configuration, the at least one power control parameter, or a combination thereof.

Clause 102. The non-transitory computer-readable medium of any of clauses 100 to 101, wherein the interference measurement report comprises: a signal-to-interference-plus-noise (SINR), Received Signal Strength Indicator (RSSI), or Reference Signal Receive Power (RSRP), of the at least one UL transmission on the set of UL T-F resources, or a differential in SINR, RSSI, or RSRP, between a first subset of the set of UL T-F resources that comprise the at least one radar signal and a second subset of the set of UL T-F resources that do not comprise the at least one radar signal, or a power headroom report that indicates an available transmission power increase to a transmission power level of the at least one radar signal, or a recommendation of one or more different resources for the at least one radar signal, or a combination thereof.

Clause 103. The non-transitory computer-readable medium of clause 102, wherein the one or more different resources comprise a time-domain resource, a frequency-domain resource, a beam resource, or a combination thereof.

Clause 104. The non-transitory computer-readable medium of any of clauses 101 to 103, wherein the interference measurement report is associated with the at least one radar signal or the set of UL T-F resources or a combination thereof and is specific to a set of symbols, a set of frequencies, a set of beam directions, or a combination thereof.

Clause 105. The non-transitory computer-readable medium of any of clauses 101 to 104, wherein the interference measurement report is transmitted in response to at least one triggering event.

Clause 106. The non-transitory computer-readable medium of clause 105, wherein the at least one triggering event comprises: initial receipt by the first base station of a request to measure the at least one radar signal, or receipt of an updated configuration for an updated set of UL T-F resources, or a measured signal-to-interference-plus-noise (SINR) on the set of UL T-F resources dropping below an SINR threshold, or a combination thereof.

Clause 107. The non-transitory computer-readable medium of clause 106, wherein the radar controller corresponds to an access network component, a core network component, a location management function (LMF) component, a component that is external to a serving network associated with the first base station, or a combination thereof.

Clause 108. The non-transitory computer-readable medium of any of clauses 95 to 107, wherein the at least one radar signal is received from a second based station.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a radar controller, comprising:
   determining a first configuration of a set of uplink (UL) time-frequency (T-F) resources for a first wireless network component to measure at least one radar signal, wherein the set of T-F resources comprises a set of resource elements in a time-frequency grid;
   determining at least one power control parameter associated with the at least one radar signal, at least one UL transmission with a potential for interference with the at least one radar signal, or a combination thereof; and
   transmitting, to the first wireless network component, a first request for a measurement operation of the at least one radar signal associated with the first configuration and the at least one power control parameter.

2. The method of claim 1, further comprising:
   determining a second configuration of a set of downlink (DL) T-F resources for a second wireless network component to transmit the at least one radar signal; and
   transmitting, to the second wireless network component, a second request for a transmission operation associated with the second configuration to the second wireless network component.

3. The method of claim 2, wherein the second configuration is configured on-demand, aperiodically, or semi-persistently.

4. The method of claim 1, wherein the at least one power control parameter comprises:
   a maximum interference on the set of UL T-F resources for the at least one UL transmission, the at least one radar signal, or a combination thereof, or
   a power level on the set of UL T-F resources for the at least one UL transmission, the at least one radar signal, or a combination thereof, or
   a relative power level on the set of UL T-F resources between the at least one radar signal and the at least one UL transmission, or
   an instruction to mute some or all UL transmissions on the set of UL T-F resources in a time-domain or a T-F domain, or
   a combination thereof.

5. The method of claim 1, wherein the first configuration is configured on-demand, aperiodically, or semi-persistently.

6. The method of claim 1, further comprising:
   receiving, from the first wireless network component, an interference measurement report; and
   determining, based on the interference measurement report, whether to update the first configuration, the at least one power control parameter, or a combination thereof.

7. The method of claim 6, wherein the interference measurement report comprises:
   a signal-to-interference-plus-noise (SINR), Received Signal Strength Indicator (RSSI), or Reference Signal Receive Power (RSRP), of the at least one UL transmission on the set of UL T-F resources, or
   a differential in SINR, RSSI, or RSRP, between a first subset of the set of UL T-F resources that comprise the at least one radar signal and a second subset of the set of UL T-F resources that do not comprise the at least one radar signal, or
   a power headroom report that indicates an available transmission power increase to a transmission power level of the at least one radar signal, or
   a recommendation of one or more different resources for the at least one radar signal, or
   a combination thereof.

8. The method of claim 7, wherein the one or more different resources comprise a time-domain resource, a frequency-domain resource, a beam resource, or a combination thereof.

9. The method of claim 6, wherein the interference measurement report is associated with the at least one radar signal or the set of UL T-F resources or a combination thereof and is specific to a set of symbols, a set of frequencies, a set of beam directions, or a combination thereof.

10. The method of claim 6, wherein the interference measurement report is received in response to at least one triggering event.

11. The method of claim 10, wherein the at least one triggering event comprises:
   initial receipt by the first wireless network component of the first request, or
   a measured signal-to-interference-plus-noise (SINR) on the set of UL T-F resources dropping below an SINR threshold, or
   receipt of an updated configuration for an updated set of UL T-F resources, or
   a combination thereof.

12. The method of claim 1, wherein the radar controller corresponds to an access network component, a core network component, a location management function (LMF) component, a component that is external to a serving network associated with the first wireless network component, or a combination thereof.

13. The method of claim 1, wherein the at least one power control parameter is configured as an update to at least one other power control power determined at the first wireless network component independently from the radar controller.

14. A method of operating a first wireless network component, comprising:
   receiving, from a radar controller, a configuration of a set of uplink (UL) time-frequency (T-F) resources for the first wireless network component to receive at least one radar signal, wherein the set of T-F resources comprises a set of resource elements in a time-frequency grid;
   determining at least one power control parameter associated with the at least one radar signal, at least one UL transmission, or a combination thereof;
   performing, based on the at least one power control parameter, at least one action to mitigate impact by the at least one radar signal to the at least one UL transmission, or by the at least one UL transmission to the at least one radar signal, or a combination thereof; and
   measuring the at least one radar signal on the set of UL T-F resources in accordance with the configuration.

15. The method of claim 14,
   wherein the determining comprises receiving the at least one power control parameter from the radar controller, or
   wherein the determining determines the at least one power control parameter independently from the radar controller.

16. The method of claim 14, wherein the at least one action comprises:
   muting the at least one UL transmission or modifying a transmission power level of the at least one UL transmission, or
   transmitting a message to the radar controller to request a modification to a transmission power level of the at least one radar signal, or
   a combination thereof.

17. The method of claim 14, wherein the at least one power control parameter comprises:
   a maximum interference on the set of UL T-F resources for the at least one UL transmission, the at least one radar signal, or a combination thereof, or
   a power level on the set of UL T-F resources for the at least one UL transmission, the at least one radar signal, or a combination thereof, or
   a relative power level on the set of UL T-F resources between the at least one radar signal and the at least one UL transmission, or
   an instruction to mute some or all UL transmissions on the set of UL T-F resources in a time-domain or a T-F domain, or
   a combination thereof.

18. The method of claim 14, wherein the configuration is configured on-demand, aperiodically, or semi-persistently.

19. The method of claim 14, further comprising:
   transmitting, to the radar controller, an interference measurement report.

20. The method of claim 19, further comprising:
   receiving, from the radar controller in response to the interference measurement report, an update to the configuration, the at least one power control parameter, or a combination thereof.

21. The method of claim 19, wherein the interference measurement report comprises:
   a signal-to-interference-plus-noise (SINR), Received Signal Strength Indicator (RSSI), or Reference Signal Receive Power (RSRP), of the at least one UL transmission on the set of UL T-F resources, or
   a differential in SINR, RSSI, or RSRP, between a first subset of the set of UL T-F resources that comprise the at least one radar signal and a second subset of the set of UL T-F resources that do not comprise the at least one radar signal, or
   a power headroom report that indicates an available transmission power increase to a transmission power level of the at least one radar signal, or
   a recommendation of one or more different resources for the at least one radar signal, or
   a combination thereof.

22. The method of claim 21, wherein the one or more different resources comprise a time-domain resource, a frequency-domain resource, a beam resource, or a combination thereof.

23. The method of claim 19, wherein the interference measurement report is associated with the at least one radar signal or the set of UL T-F resources or a combination thereof and is specific to a set of symbols, a set of frequencies, a set of beam directions, or a combination thereof.

24. The method of claim 19, wherein the interference measurement report is transmitted in response to at least one triggering event.

25. The method of claim 24, wherein the at least one triggering event comprises:
   initial receipt by the first wireless network component of a request to measure the at least one radar signal, or
   receipt of an updated configuration for an updated set of UL T-F resources, or
   a measured signal-to-interference-plus-noise (SINR) on the set of UL T-F resources dropping below an SINR threshold, or
   a combination thereof.

26. The method of claim 25, wherein the radar controller corresponds to an access network component, a core network component, a location management function (LMF) component, a component that is external to a serving network associated with the first wireless network component, or a combination thereof.

27. The method of claim 14, wherein the at least one radar signal is received from a second based station.

28. A radar controller, comprising:
   a memory;
   at least one transceiver; and
   at least one processor communicatively coupled to the memory and the at least one transceiver, the at least one processor configured to:

determine a first configuration of a set of uplink (UL) time-frequency (T-F) resources for a first wireless network component to measure at least one radar signal, wherein the set of T-F resources comprises a set of resource elements in a time-frequency grid;

determine at least one power control parameter associated with the at least one radar signal, at least one UL transmission with a potential for interference with the at least one radar signal, or a combination thereof; and transmit, via the at least one transceiver, to the first wireless network component, a first request for a measurement operation associated with the first configuration and the at least one power control parameter.

29. The radar controller of claim 28, wherein the at least one processor is further configured to:

determine a second configuration of a set of downlink (DL) T-F resources for a second wireless network component to transmit the at least one radar signal; and transmit, via the at least one transceiver, to the second wireless network component, a second request for a transmission operation associated with the second configuration to the second wireless network component.

30. A wireless network component, comprising:

a memory;

at least one transceiver; and at least one processor communicatively coupled to the memory and the at least one transceiver, the at least one processor configured to:

receive, via the at least one transceiver, from a radar controller, a configuration of a set of uplink (UL) time-frequency (T-F) resources for the wireless network component to receive at least one radar signal, wherein the set of T-F resources comprises a set of resource elements in a time-frequency grid;

determine at least one power control parameter associated with the at least one radar signal, at least one UL transmission, or a combination thereof;

perform, based on the at least one power control parameter, at least one action to mitigate impact by the at least one radar signal to the at least one UL transmission, or by the at least one UL transmission to the at least one radar signal, or a combination thereof; and measure the at least one radar signal on the set of UL T-F resources in accordance with the configuration.

* * * * *